(12) United States Patent
Okunishi et al.

(10) Patent No.: US 9,926,873 B2
(45) Date of Patent: Mar. 27, 2018

(54) INTERNAL COMBUSTION ENGINE CONTROL APPARATUS

(71) Applicant: HONDA MOTOR CO., LTD., Tokyo (JP)

(72) Inventors: Shinichi Okunishi, Wako (JP); Ken Ogawa, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 15/204,998

(22) Filed: Jul. 8, 2016

(65) Prior Publication Data

US 2017/0009688 A1    Jan. 12, 2017

(30) Foreign Application Priority Data

Jul. 10, 2015   (JP) .................................. 2015-138598
Dec. 10, 2015   (JP) .................................. 2015-241447

(51) Int. Cl.
F02D 41/14    (2006.01)
F02D 41/30    (2006.01)
(Continued)

(52) U.S. Cl.
CPC ....... F02D 41/1486 (2013.01); F02D 35/023 (2013.01); F02D 35/024 (2013.01);
(Continued)

(58) Field of Classification Search
CPC ............. F02D 41/1486; F02D 41/0097; F02D 41/1458; F02D 41/34; F02D 41/0007;
(Continued)

(56) References Cited

U.S. PATENT DOCUMENTS

2006/0150953 A1* 7/2006 Moriya .................. F02D 41/40
                                                           123/435
2016/0312727 A1* 10/2016 Nakasaka ........... F02D 41/0085
(Continued)

FOREIGN PATENT DOCUMENTS

JP    2008-231995    10/2008
JP    4803100 B2     11/2008

OTHER PUBLICATIONS

Office Action with Form PTO-892 Notice of References Cited issued by the United States Patent and Trademark Office for the co-pending U.S. Appl. No. 15/204,997, dated Jul. 6, 2017.

*Primary Examiner* — John Kwon
*Assistant Examiner* — Johnny H Hoang
(74) *Attorney, Agent, or Firm* — Mori & Ward, LLP

(57) ABSTRACT

An internal combustion engine control apparatus includes a cylinder pressure sensor, a driving condition detector, a reference crank angle setter, a reference cylinder pressure calculator, an air-fuel ratio estimator, and a controller. The cylinder pressure sensor detects a cylinder pressure. The driving condition detector detects a driving condition in an engine. The reference crank angle setter calculates a reference crank angle immediately before which an air-fuel mixture starts combusting in accordance with the driving condition. The reference cylinder pressure calculator calculates a reference cylinder pressure in the cylinder at the reference crank angle based on temperature characteristics of a specific-heat ratio of the air-fuel mixture under a condition. The air-fuel ratio estimator calculates an air-fuel ratio based on a pressure difference between the reference cylinder pressure and the cylinder pressure at the reference crank angle. The controller controls the engine in accordance with the air-fuel ratio.

16 Claims, 16 Drawing Sheets

(51) Int. Cl.
  *F02M 47/00* (2006.01)
  *F02D 41/34* (2006.01)
  *F02D 35/02* (2006.01)
  *F02D 41/00* (2006.01)
  *F02M 57/00* (2006.01)

(52) U.S. Cl.
  CPC ..... *F02D 41/0097* (2013.01); *F02D 41/1458* (2013.01); *F02D 41/34* (2013.01); *F02D 41/0007* (2013.01); *F02D 2041/001* (2013.01); *F02D 2041/1409* (2013.01); *F02D 2041/1433* (2013.01); *F02D 2200/023* (2013.01); *F02M 57/005* (2013.01); *F02M 2200/247* (2013.01); *Y02T 10/44* (2013.01)

(58) Field of Classification Search
  CPC ............. F02D 35/024; F02D 2200/023; F02D 41/023; F02D 41/025; F02M 47/00
  USPC ................... 123/435, 568.11, 568.17, 559.1; 701/702–105, 108
  See application file for complete search history.

(56) References Cited

U.S. PATENT DOCUMENTS

2017/0009682 A1\* 1/2017 Okunishi ............ F02D 41/0072
2017/0009688 A1 1/2017 Okunishi et al.

\* cited by examiner

INTERNAL COMBUSTION ENGINE CONTROL APPARATUS

CROSS-REFERENCE TO RELATED APPLICATIONS

The present application claims priority under 35 U.S.C. § 119 to Japanese Patent Application No. 2015-138598, filed Jul. 10, 2015 and Japanese Patent Application No. 2015-241447, filed Dec. 10, 2015, entitled "Internal Combustion Engine Control Apparatus." The contents of these applications are incorporated herein by reference in their entirety.

BACKGROUND

1. Field

The present disclosure relates to an internal combustion engine control apparatus.

2. Description of the Related Art

As a conventional method for estimating this type of air-fuel ratio, for example, one disclosed in Japanese Patent No. 4803100 is known. The estimation method is intended to estimate and evaluate an air-fuel ratio via a specific-heat ratio with a focus on the fact that a change in the status of an air-fuel mixture in the compression stroke in an internal combustion engine is a polytropic change and the fact that a specific-heat ratio of an air-fuel mixture varies with an air-fuel ratio. More specifically, a specific-heat ratio κ of an air-fuel mixture is calculated from respective cylinder pressures P1 and P2 detected at two predetermined crank angles θ1 and θ2 by a cylinder pressure sensor during the combustion stroke and cylinder volumes V1 and V2 corresponding to the crank angles θ1 and θ2 by the following expression:

$$\kappa = \log(P1/P2)/\log(V2/V1)$$

A reference specific-heat ratio κ0 is calculated by searching across a predetermined target air-fuel ratio-specific-heat ratio map in accordance with a target air-fuel ratio set at the time. If a deviation Δκ of the calculated specific-heat ratio κ from the reference specific-heat ratio κ0 is larger than a predetermined value, a departure of an actual air-fuel ratio from the target air-fuel ratio is considered large, and ignition timing and a fuel injection quantity are corrected in accordance with the deviation Δκ.

SUMMARY

According to one aspect of the present disclosure, an internal combustion engine control apparatus for estimating an air-fuel ratio of an air-fuel mixture, with which a cylinder is filled, and controlling an internal combustion engine using the estimated air-fuel ratio, the control apparatus includes a cylinder pressure sensor, an operational status detection unit, a reference crank angle setting unit, a reference cylinder pressure calculation unit, an air-fuel ratio estimation unit, and a control unit. The cylinder pressure sensor detects a pressure in the cylinder as a cylinder pressure. The operational status detection unit detects an operational status of the internal combustion engine. The reference crank angle setting unit sets, as a reference crank angle, a crank angle immediately before combustion of the air-fuel mixture is started in accordance with the detected operational status of the internal combustion engine. The reference cylinder pressure calculation unit calculates, as a reference cylinder pressure, a pressure in the cylinder generated at the set reference crank angle on a basis of a temperature property of a specific-heat ratio of the air-fuel mixture on the conditions that no external EGR gas derived from an exhaust reflux is present in the air-fuel mixture and that the air-fuel ratio of the air-fuel mixture is a predetermined air-fuel ratio. The air-fuel ratio estimation unit estimates the air-fuel ratio of the air-fuel mixture on a basis of a pressure difference between an actual cylinder pressure detected at the reference crank angle by the cylinder pressure sensor and the calculated reference cylinder pressure. The control unit controls the internal combustion engine in accordance with the estimated air-fuel ratio of the air-fuel mixture.

According to another aspect of the present disclosure, an internal combustion engine control apparatus includes a cylinder pressure sensor, a driving condition detector, a reference crank angle setter, a reference cylinder pressure calculator, an air-fuel ratio estimator, and a controller. The cylinder pressure sensor detects a cylinder pressure in the cylinder to which an air-fuel mixture is supplied. The driving condition detector detects a driving condition in an internal combustion engine. The reference crank angle setter calculates, in accordance with the driving condition detected by the driving condition detector, a reference crank angle immediately before which the air-fuel mixture in the cylinder starts combusting. The reference cylinder pressure calculator calculates a reference cylinder pressure in the cylinder at the reference crank angle based on temperature characteristics of a specific-heat ratio of the air-fuel mixture under a condition that the air-fuel mixture does not include external EGR gas derived from an exhaust reflux and that the air-fuel mixture has a predetermined air-fuel ratio. The air-fuel ratio estimator calculates the air-fuel ratio of the air-fuel mixture based on a pressure difference between the reference cylinder pressure and the cylinder pressure detected by the cylinder pressure sensor at the reference crank angle. The controller controls the internal combustion engine in accordance with the air-fuel ratio of the air-fuel mixture calculated by the air-fuel ratio estimator.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings.

DESCRIPTION OF THE EMBODIMENTS

Figure 1:
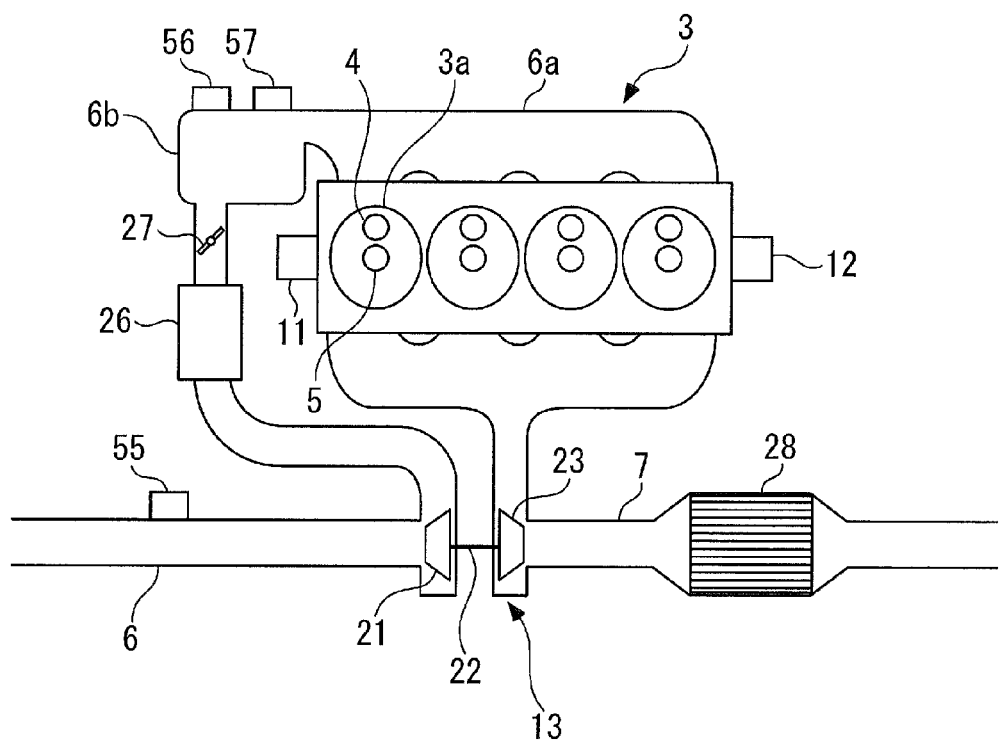
FIG. 1 is a diagram schematically showing the configuration of an internal combustion engine, to which the present disclosure is applied.

The embodiments will now be described with reference to the accompanying drawings, wherein like reference numerals designate corresponding or identical elements throughout the various drawings.

As shown in FIG. 1, an internal combustion engine (hereinafter referred to as an "engine") 3, to which the present disclosure is applied, is a gasoline engine having, for example, four cylinders 3a and is mounted on a vehicle (not shown) as a power source.

Figure 2:
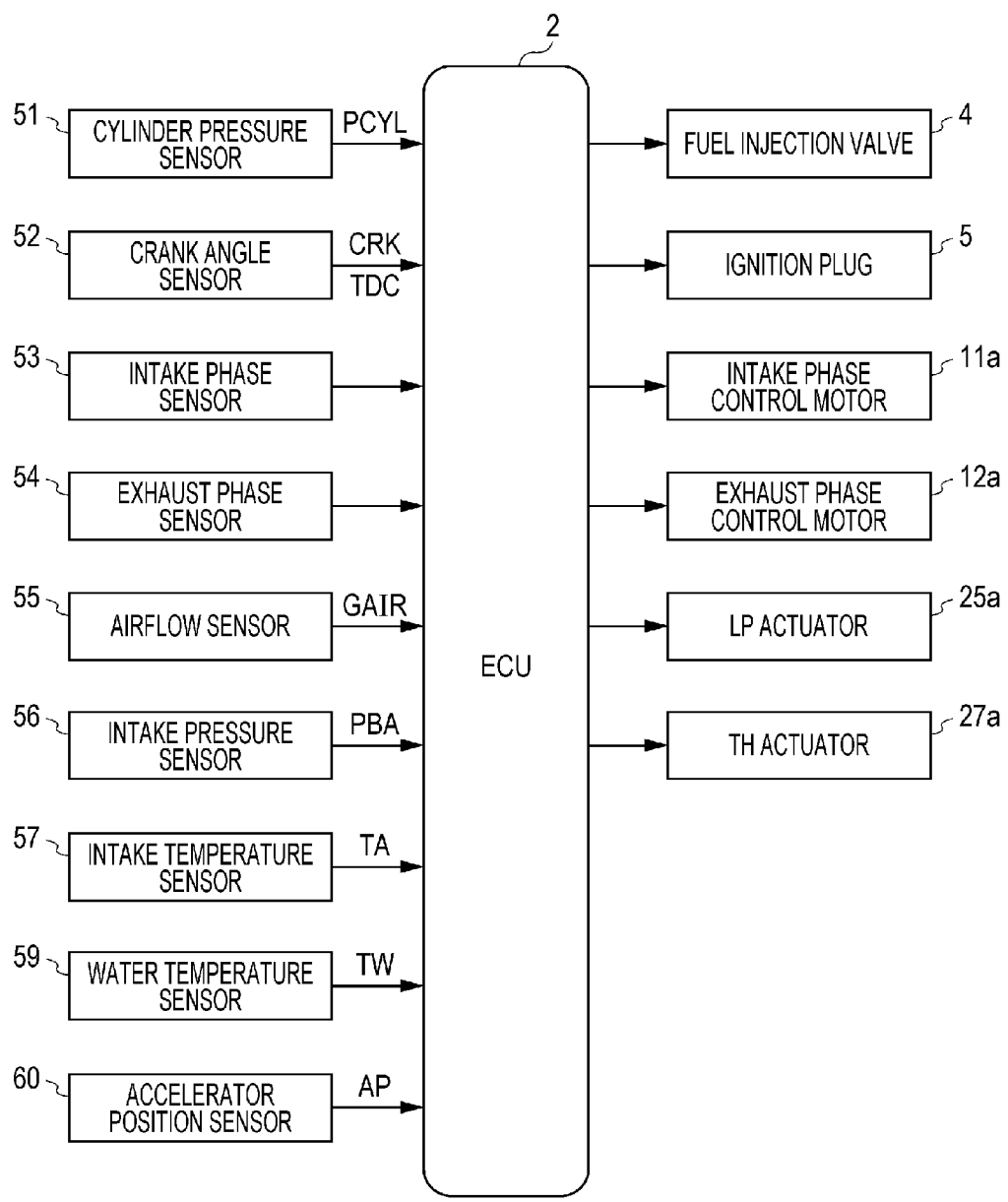
FIG. 2 is a block diagram showing the schematic configuration of a control apparatus.

In each cylinder 3a of the engine 3, a fuel injection valve (hereinafter referred to as an "injector") 4 and an ignition plug 5 are provided so as to face a combustion chamber (not shown) of the cylinder 3a. The injector 4 is of the type to directly inject fuel into the combustion chamber. Spark discharge from the ignition plug 5 ignites an air-fuel mixture of fuel and air to produce combustion. The fuel injection quantity and fuel injection timing from the injector 4 and ignition timing IGLOG for the ignition plug 5 are controlled in accordance with control signals from an electronic control unit (hereinafter referred to as an "ECU") 2 (see FIG. 2).

Note that an "air-fuel mixture" in the present embodiment is a cylinder gas, with which the cylinder 3a is filled and which is supplied for combustion, and, if internal EGR (to be described later) is performed, includes internal EGR gas.

Each cylinder 3a of the engine 3 is provided with a cylinder pressure sensor 51 which detects a pressure inside the cylinder 3a (a cylinder pressure). In the present embodiment, the cylinder pressure sensor 51 is of the type integrated with an injector. Although not shown, a pressure detection element which faces the combustion chamber and picks up a cylinder pressure, an amplifier circuit which amplifies and outputs a signal from the pressure detection element, and the like are assembled to the injector 4 integrally with the injector 4. A detection signal representing a cylinder pressure PCYL detected by the cylinder pressure sensor 51 is input to the ECU 2.

The engine 3 includes a variable intake phase mechanism 11, a variable exhaust phase mechanism 12, a turbocharger 13, and the like.

The variable intake phase mechanism 11 steplessly changes a relative phase (hereinafter referred to as an "intake phase") CAIN of an intake valve to a crankshaft of the engine 3 (both the intake valve and the crankshaft are not shown). The variable intake phase mechanism 11 includes an intake phase control motor 11a (see FIG. 2) and the like. The intake phase control motor 11a rotates an intake camshaft (not shown) relative to the crankshaft in accordance with a control signal from the ECU 2 to change a relative angle between the intake camshaft and the crankshaft. With this operation, the intake phase control motor 11a steplessly changes the intake phase CAIN.

Similarly, the variable exhaust phase mechanism 12 steplessly changes a relative phase (hereinafter referred to as an "exhaust phase") CAEX of an exhaust valve (not shown) to the crankshaft and includes an exhaust phase control motor 12a (see FIG. 2) and the like. The exhaust phase control motor 12a rotates an exhaust camshaft (not shown) relative to the crankshaft in accordance with a control signal from the ECU 2 to change a relative angle between the exhaust camshaft and the crankshaft. With this operation, the exhaust phase control motor 12a steplessly changes the exhaust phase CAEX.

The variable intake phase mechanism 11 and the variable exhaust phase mechanism 12 control valve opening and closing timing for the intake valve and that for the exhaust valve, respectively, by changing the intake phase CAIN and the exhaust phase CAEX and are used to control internal EGR using valve overlap between the intake valve and the exhaust valve.

The turbocharger 13 includes a compressor 21 which is provided in an intake passage 6 and a turbine 23 which is provided in an exhaust passage 7 and is integrally coupled to the compressor 21 via a shaft 22. The turbine 23 is driven by exhaust gas flowing through the exhaust passage 7, and the compressor 21 rotates integrally with the turbine 23. This causes supercharging of intake air. A boost pressure is adjusted by controlling a waste gate valve (not shown) and the like in accordance with a control signal from the ECU 2.

The compressor 21 of the turbocharger 13, an inter-cooler 26 for cooling intake air raised in temperature through supercharging, and a throttle valve 27 are provided in the intake passage 6 in order from the upstream side.

The throttle valve 27 is arranged upstream of an intake manifold 6a of the intake passage 6. The degree of opening of the throttle valve 27 is controlled via a TH actuator 27a in accordance with a control signal from the ECU 2. This controls the amount of cylinder gas sucked into the cylinder 3a.

A three-way catalyst 28 is provided downstream of the turbine 23 in the exhaust passage 7. The three-way catalyst 28 in an active state oxidizes HC and CO in exhaust gas and reduces $NO_x$ to purify the exhaust gas.

The engine 3 is provided with the various sensors below to detect an operational status (or a driving condition detection unit) thereof, in addition to the cylinder pressure sensor 51 described earlier (see FIG. 2).

A crank angle sensor 52 outputs a CRK signal and a TDC signal, which are pulse signals, to the ECU 2 for every predetermined increment in crank angle with rotation of the crankshaft. A CRK signal is output for every predetermined increment in crank angle (for example, 0.5 degrees). The ECU 2 calculates a speed (hereinafter referred to as an "engine speed") NE of the engine 3 on the basis of such CRK signals.

A TDC signal is a signal indicating that a piston (not shown) of the engine 3 is at a predetermined crank angle position in the vicinity of an intake top dead center (TDC) in any of the cylinders 3a. If the engine 3 is a four-cylinder one, as in the present embodiment, a TDC signal is output for every increment in crank angle of 180 degrees. The ECU 2 calculates, for each cylinder 3a, a crank angle CA based on output timing for a TDC signal on the basis of a TDC signal and a CRK signal. The ECU 2 also calculates and assigns a crank angle stage FISTG (=0 to 23) for each predetermined crank angle range (for example, 30 degrees) on the basis of a TDC signal and a CRK signal.

The intake camshaft, to which the variable intake phase mechanism 11 is attached, and the exhaust camshaft, to which the variable exhaust phase mechanism 12 is attached, are provided with an intake phase sensor 53 and an exhaust phase sensor 54, respectively. The intake phase sensor 53 outputs, to the ECU 2, a CAMIN signal which is a pulse signal for every predetermined increment in cam angle (for example, 0.5 degrees) with rotation of the intake camshaft. The ECU 2 calculates the intake phase CAIN on the basis of a CAMIN signal and a CRK signal. Similarly, the exhaust phase sensor 54 outputs, to the ECU 2, a CAMEX signal for every predetermined increment in cam angle (for example, 0.5 degrees) with rotation of the exhaust camshaft. The ECU 2 calculates the exhaust phase CAEX on the basis of a CAMEX signal and a CRK signal.

In the intake passage 6, an airflow sensor 55 is provided upstream of an intake throttling valve 25, and an intake pressure sensor 56 and an intake temperature sensor 57 are provided in an intake chamber 6b downstream of the throttle valve 27. The airflow sensor 55 detects the amount (a suction air amount) GAIR of air (new air) sucked into the cylinder 3a. The intake pressure sensor 56 detects a pressure (an intake pressure) PBA of intake air sucked into the cylinder 3a as an absolute pressure. The intake temperature sensor 57 detects a temperature (an intake temperature) TA of intake air including external EGR gas. Detection signals from these sensors are input to the ECU 2.

A detection signal indicating a temperature (hereinafter referred to as an "engine water temperature") TW of cooling water which cools the engine 3 from a water temperature sensor 59 and a detection signal indicating the amount (hereinafter referred to as an "accelerator position") ΔP of depression of an accelerator pedal (not shown) of the vehicle from an accelerator position sensor 60 are further input to the ECU 2.

The ECU 2 is composed of a microcomputer which is made up of a CPU, a RAM, a ROM, and an I/O interface (all of which are not shown), and the like. The ECU 2 judges the operational status (or the driving condition) of the engine 3 in accordance with detection signals from the various sensors described earlier, and the like and executes engine control including control of the fuel injection quantity of the injector 4 and the ignition timing IGLOG of the ignition plug 5, and the like. In the present embodiment, in particular, the ECU 2 estimates an air-fuel ratio AF of the air-fuel mixture, with which the cylinder 3a is filled, and executes fuel injection control in accordance with the estimated air-fuel ratio AF.

In the present embodiment, the ECU 2 corresponds to a reference crank angle setting unit, a reference cylinder pressure calculation unit, an air-fuel ratio estimation unit, a control unit, an initial crank angle acquisition unit, an initial cylinder temperature acquisition unit, and a target air-fuel ratio setting unit.

Figure 3:
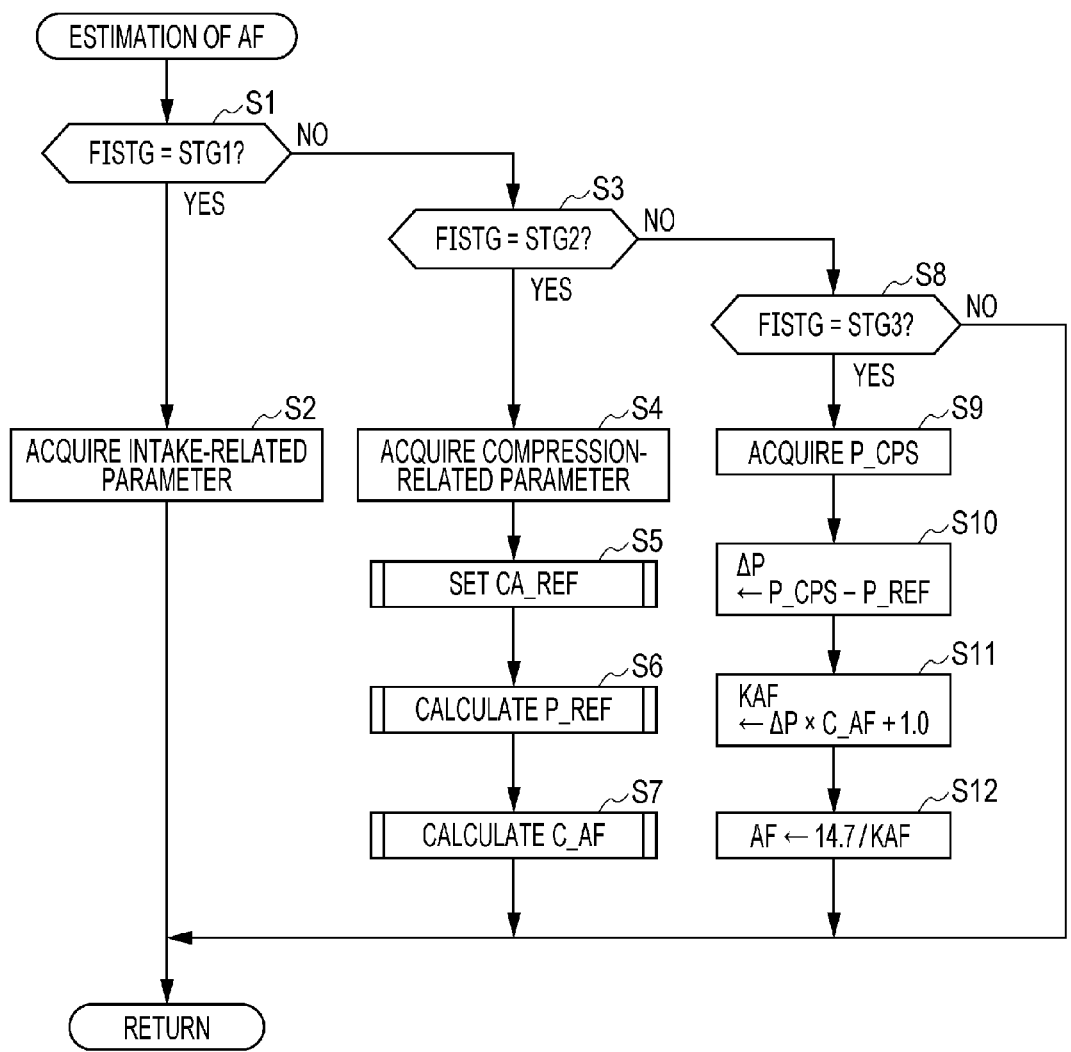
FIG. 3 shows a main flow of a process of estimating an air-fuel ratio of an air-fuel mixture.

FIG. 3 shows a main flow of a process of estimating the air-fuel ratio AF of the air-fuel mixture to be executed by the ECU 2. The present process is repeatedly executed at intervals (for example, for every increment in crank angle of 30 degrees) equal to a switching interval for the crank angle stage FISTG described earlier for each cylinder 3a. Note that a process directly related to a cylinder pressure PCYL which is detected by the cylinder pressure sensor 51 is executed at intervals (for example, for every increment in crank angle of 0.5 degrees) equal to a generation interval for a CRK signal separately from the present process. For example, the detected cylinder pressure PCYL is stored in association with the crank angle CA.

In the estimation process in FIG. 3, in step 1 (denoted by "S1" in the drawing, the same applying hereinafter), the ECU 2 judges whether the crank angle stage FISTG is equal to a first predetermined value STG1 corresponding to the intake top dead center (TDC). If a result of the judgment is YES, and the cylinder 3a in question is in a stage immediately after a transition to the intake stroke, the ECU 2 acquires an intake-related parameter (step 2). More specifically, the ECU 2 reads out the intake temperature TA, the engine water temperature TW, and the exhaust phase CAEX that are detected as intake-related parameters and stores the parameters in a predetermined region of the RAM of the ECU 2. After that, the ECU 2 ends the present process.

If the result of the judgment in step 1 is NO, the ECU 2 judges whether the crank angle stage FISTG is equal to a second predetermined value STG2 corresponding to a compression bottom dead center (BDC) (step 3). If a result of the judgment is YES, and the cylinder 3a is in a stage immediately after a transition to the compression stroke, the ECU 2 acquires a compression-related parameter (step 4). More specifically, the ECU 2 reads out, as compression-related parameters, the intake pressure PBA, the engine speed NE, and the intake phase CAIN that are detected, and the ignition timing IGLOG set at the time and stores the parameters in a predetermined region of the RAM of the ECU 2.

Figure 4:
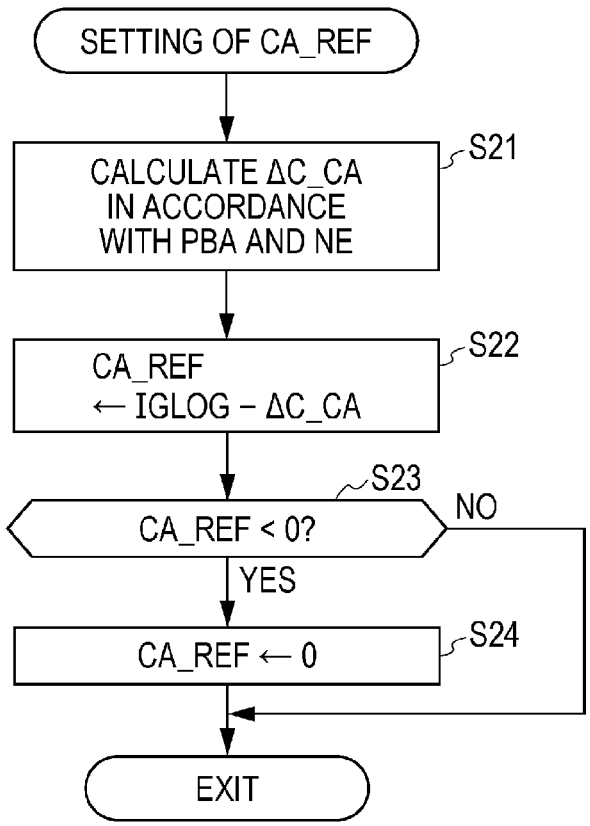
FIG. 4 shows a subroutine representing a process of setting a reference crank angle.

The ECU 2 then executes a process of setting a reference crank angle CA_REF (step 5). The setting process predicts timing immediately before combustion of the air-fuel mixture is started and sets the timing as the reference crank angle CA_REF. FIG. 4 shows a subroutine for the process.

In the present process, in step 21, the ECU 2 calculates a retard correction amount ΔC_CA by searching across a predetermined map (not shown) in accordance with the intake pressure PBA and the engine speed NE acquired in step 4 described above. The retard correction amount ΔC_CA corresponds to an ignition delay time from when ignition operation is performed by the ignition plug 5 at the ignition timing IGLOG to when the air-fuel mixture is ignited and combustion is started and is expressed as a crank angle. The likelihood of the air-fuel mixture igniting decreases with a decrease in the intake pressure PBA. A crank angle corresponding to a single ignition delay time increases with an increase in the engine speed NE. For this reason, the retard correction amount ΔC_CA is set to increase in value with a decrease in the intake pressure PBA and with an increase in the engine speed NE in the above-described map.

The ECU 2 then sets the reference crank angle CA_REF by subtracting the retard correction amount ΔC_CA from the ignition timing IGLOG acquired in step 4 described above (step 22). Note that the ignition timing IGLOG and the reference crank angle CA_REF are each expressed by assuming the compression TDC of each cylinder 3a as an origin (0 degrees) and the advance side as positive (see FIG. 10).

The ECU 2 judges whether the set reference crank angle CA_REF is less than 0 degrees corresponding to the compression TDC (step 23). If a result of the judgment is NO, that is, if the reference crank angle CA_REF corresponds to the compression TDC or is closer to the advance side than the compression TDC, the ECU 2 ends the present process without any process.

On the other hand, if the result of the judgment in step 23 is YES, and the reference crank angle CA_REF is closer to the retard side than the compression TDC, the ECU 2 limits the reference crank angle CA_REF to 0 degrees corresponding to the compression TDC (step 24) and ends the present process.

Referring back to FIG. 3, in step 6 subsequent to step 5 described above, the ECU 2 executes a process of calculating a reference cylinder pressure P_REF. The reference cylinder pressure P_REF is a cylinder pressure which is generated at the reference crank angle CA_REF described above on the conditions that no external EGR gas is present in the air-fuel mixture and that an air-fuel ratio of the air-fuel mixture is a theoretical air-fuel ratio. The details of the calculation process will be described later.

Figure 5:
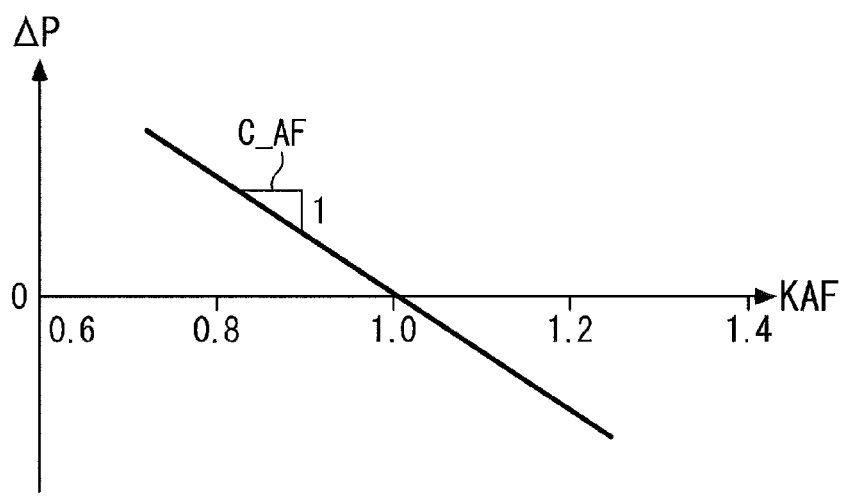
FIG. 5 is a chart showing the relationship between a pressure difference between an actual cylinder pressure and a reference cylinder pressure, and an equivalence ratio of an air-fuel mixture.

The ECU 2 then executes a process of calculating an AF coefficient (air-fuel ratio coefficient) C_AF (step 7) and ends the present process. As shown in FIG. 5, since a linear relationship is found between a pressure difference ΔP (a difference between an actual cylinder pressure P_CPS (to be described later) and the reference cylinder pressure P_REF) and an equivalence ratio KAF of the air-fuel mixture, a slope (KAF/ΔP) of the equivalence ratio KAF with respect to the pressure difference ΔP is defined as the AF coefficient C_AF. The details of the calculation process will be described later.

If a result of the judgment in step 3 described above is NO, the ECU 2 judges whether the crank angle stage FISTG is equal to a third predetermined value STG3 corresponding to the compression top dead center (TDC) (step 8). If the result of the judgment is NO, the ECU 2 ends the present process without any process. If the result of the judgment in step 8 is YES, and the cylinder 3a is in a stage immediately after the compression stroke is ended, the ECU 2 reads out the cylinder pressure PCYL detected at the reference crank angle CA_REF set in step 5 from the RAM and acquires the cylinder pressure PCYL as the actual cylinder pressure P_CPS (step 9).

The ECU 2 then calculates, as the pressure difference ΔP, a difference between the acquired actual cylinder pressure P_CPS and the reference cylinder pressure P_REF (=P_CPS−P_REF) (step 10). The ECU 2 calculates the equivalence ratio KAF of the air-fuel mixture using the pressure difference ΔP and the AF coefficient C_AF calculated so far by Expression (A) below (step 11).

$$KAF = \Delta P \times C\_AF + 1.0 \qquad (A)$$

Note that Expression (A) is derived from the definition of the AF coefficient C_AF described above and the relational fact that, if the air-fuel ratio AF is the theoretical air-fuel ratio (the equivalence ratio KAF=1.0), the actual cylinder pressure P_CPS coincides with the reference cylinder pressure P_REF and the pressure difference ΔP is 0 (see FIG. 5).

The ECU 2 then calculates the air-fuel ratio AF of the air-fuel mixture from the equivalence ratio KAF and the theoretical air-fuel ratio (=14.7) by Expression (B) below (step 12) and ends the present process.

$$AF = 14.7/KAF \qquad (B)$$

The process of calculating the reference cylinder pressure P_REF according to the first embodiment to be executed in step 6 of FIG. 3 will be described with reference to FIG. 6. In the present process, in step 31, the ECU 2 calculates valve closing timing (hereinafter referred to as "intake valve closing timing") IVC for the intake valve from the intake phase CAIN acquired in step 2 described above. The intake valve closing timing IVC is expressed as a crank angle by assuming the compression TDC as an origin (0 degrees) and the advance side as positive, like the reference crank angle CA_REF described earlier.

If the intake valve closing timing IVC is set during the compression stroke, since compression of the air-fuel mixture is virtually started from closing of the intake valve, the intake valve closing timing IVC corresponds to a crank angle (an initial crank angle) at the start of compression. The intake pressure PBA corresponds to a cylinder pressure (an initial cylinder pressure) at the start of the compression.

The ECU 2 then calculates an initial cylinder temperature T_STRT which is a temperature in the cylinder 3a at the start of the compression by searching across a predetermined map (not shown) in accordance with the intake temperature TA, the intake phase CAIN, and the exhaust phase CAEX (step 32). Of the above-described parameters, the intake phase CAIN and the exhaust phase CAEX are intended to reflect a rise in cylinder temperature corresponding to the amount of internal EGR if internal EGR using valve overlap between the intake valve and the exhaust valve is executed. For this reason, in the above-described map, the initial cylinder temperature T_STRT is set to increase in value with an increase in the intake temperature TA and with an increase in valve overlap for the intake phase CAIN and the exhaust phase CAEX.

Figure 7:
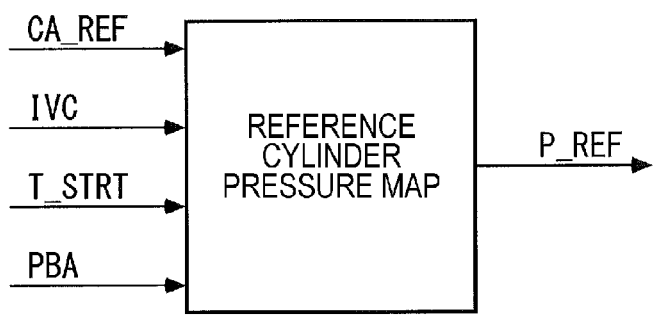
FIG. 7 is a diagram showing an input-output relation of a reference cylinder pressure map.

In next step 33, the ECU 2 calculates the reference cylinder pressure P_REF by searching across a reference cylinder pressure map shown in FIG. 7 in accordance with the reference crank angle CA_REF, the intake valve closing timing IVC, the initial cylinder temperature T_STRT, and the intake pressure PBA. The reference cylinder pressure map will be described below.

A specific-heat ratio of the air-fuel mixture (cylinder gas), with which the cylinder 3a is filled, and a change in status in the compression stroke will be described. A specific-heat ratio κ of the air-fuel mixture is represented using specific heat $C_p$ at constant pressure and a gas constant R by Expression (1) below, and the specific heat $C_p$ at constant pressure is represented by Expression (2) below.

$$\mathcal{K} = \frac{C_p}{(C_p - R)} \qquad (1)$$

where κ is a specific-heat ratio of an air-fuel mixture, $C_p$ is specific heat at constant pressure of the air-fuel mixture, and R is a gas constant.

$$C_p = \frac{(C_{pO_2}(T) \cdot n_{O_2} + C_{pN_2}(T) \cdot n_{N_2} + C_{pH_2O}(T) \cdot n_{H_2O} + C_{pCO_2}(T) \cdot n_{CO_2} + C_{Fuel}(T) \cdot n_{Fuel})}{(n_{O_2} + n_{N_2} + n_{H_2O} + n_{CO_2} + n_{Fuel})} \qquad (2)$$

where $C_{pX}$ is specific heat at constant pressure of an X component ($O_2$, $N_2$, $H_2O$, $CO_2$, or Fuel (a fuel)) of an air-fuel mixture, $n_X$ is the number of moles of the X component, and T is a cylinder temperature.

Figure 8:
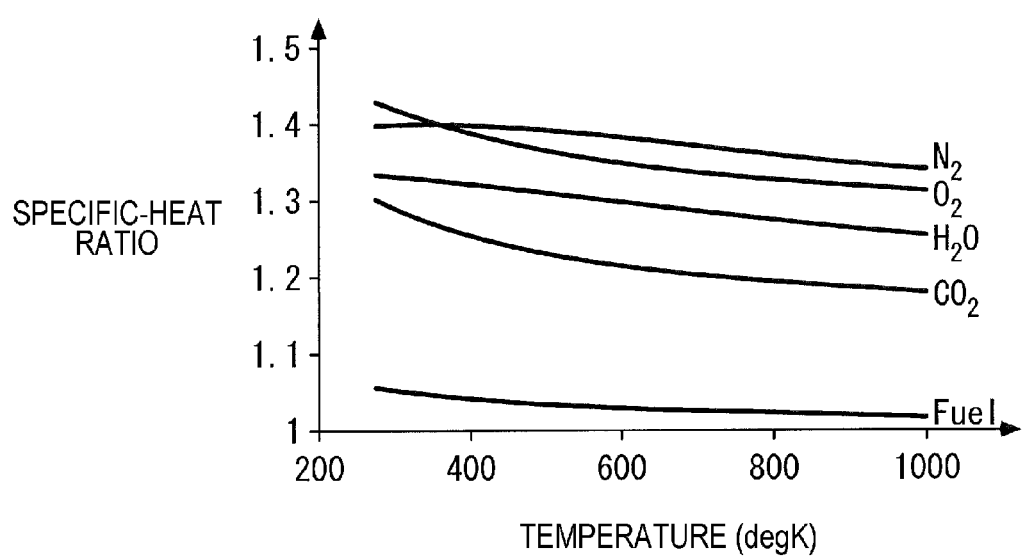
FIG. 8 is a chart showing a temperature property of a specific-heat ratio of each component of an air-fuel mixture.
Figure 9:
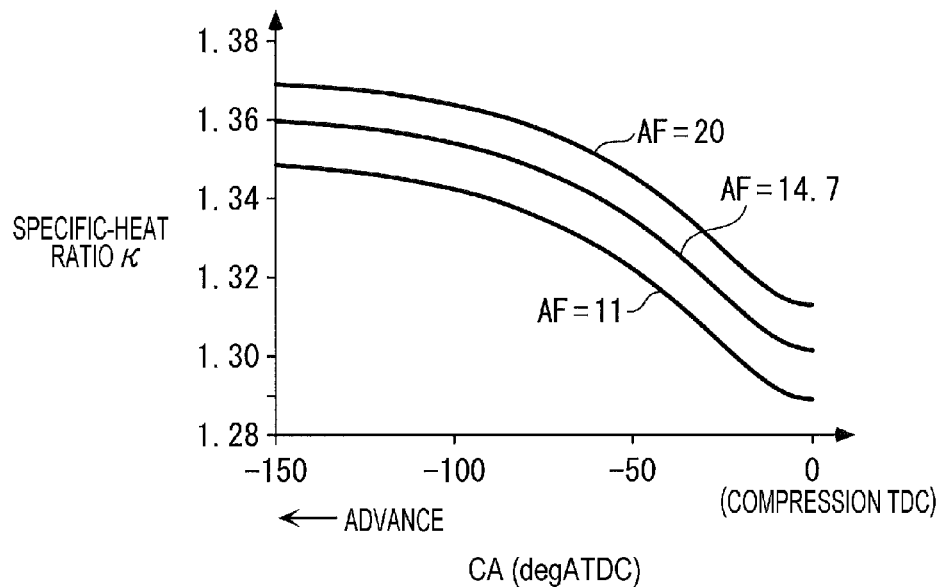
FIG. 9 is a chart showing the relationship of a specific-heat ratio of an air-fuel mixture to a crank angle in the compression stroke for each of air-fuel ratios different from one another.

As indicated in Expression (2), the specific-heat ratio κ of the air-fuel mixture varies with the composition (components and the number of moles of each component) of the air-fuel mixture. As shown in FIG. 8, a specific-heat ratio of each component of the air-fuel mixture has the temperature property of decreasing with a rise in temperature, and the specific-heat ratio κ of the air-fuel mixture composed of the components also has a similar temperature property. Additionally, as shown in FIG. 9, the air-fuel mixture has the property that a fuel component decreases with an increase in the air-fuel ratio AF of the air-fuel mixture, which increases the specific-heat ratio κ of the air-fuel mixture.

Since a change in the status of the air-fuel mixture in the compression stroke is an adiabatic compression change and is regarded as a polytropic change, a cylinder temperature $T_a$ when the crank angle CA=a is represented by Expression (3) below.

$$T_a = T_{a-1}\left(\frac{V_{a-1}}{V_a}\right)^{(\mathcal{K}_{a-1}-1)} \qquad (3)$$

where $T_a$ is a cylinder temperature when CA=a, V is a cylinder volume, $V_a$ is a cylinder volume when CA=a, and $\mathcal{K}_a$ is a specific-heat ratio when CA=a.

As indicated in Expression (3), the cylinder temperature T is a function of the specific-heat ratio κ. As described above, the specific-heat ratio κ of the air-fuel mixture is a function of the cylinder temperature T. For this reason, to accurately obtain the specific-heat ratio κ and the cylinder temperature T, sequential computation, in which a computational result of Expressions (1) and (2) and a computational result of Expression (3) are sequentially applied to each other, is performed. As a result, a cylinder temperature (final cylinder temperature) $T_\theta$ when the crank angle CA=a final crank angle θ is represented by Expression (4) below.

$$T_\theta = T_0\left(\frac{V_0}{V_1}\right)^{(\mathcal{K}_0-1)} \times \left(\frac{V_1}{V_2}\right)^{(\mathcal{K}_1-1)} \times \cdots \times \left(\frac{V_{\theta-1}}{V_\theta}\right)^{(\mathcal{K}_{\theta-1}-1)} \qquad (4)$$

where $T_\theta$ is a cylinder temperature (final cylinder temperature) when CA=θ, $T_0$ is an initial cylinder temperature, $V_0$ is an initial cylinder volume, $V_\theta$ is a cylinder volume (final cylinder volume) when CA=θ, $b\kappa_0$ is initial specific heat of an air-fuel mixture, and $\kappa_\theta$ is specific heat of the air-fuel mixture when CA=θ.

A cylinder pressure $P_a$ when the crank angle CA=a is represented by Expression (5) below. From Expression (5), a cylinder pressure (final cylinder pressure) $P_\theta$ when the crank angle CA=θ is represented by Expression (6) below.

$$P_a = P_{a-1}\left(\frac{V_{a-1}}{V_a}\right)^{\mathcal{K}_{a-1}} \qquad (5)$$

where $P_a$ is a cylinder pressure when CA=a.

$$P_\theta = P_0\left(\frac{V_0}{V_1}\right)^{\mathcal{K}_0} \times \left(\frac{V_1}{V_2}\right)^{\mathcal{K}_1} \times \cdots \times \left(\frac{V_{\theta-1}}{V_\theta}\right)^{\mathcal{K}_{\theta-1}} \qquad (6)$$

where $P_\theta$ is a cylinder pressure (final cylinder pressure) when CA=θ, and $P_0$ is an initial cylinder pressure.

As indicated in Expression (6), the final cylinder pressure $P_\theta$ is a function of the initial cylinder pressure $P_0$, the initial cylinder volume $V_0$, the final cylinder volume $V_\theta$, and the sequentially calculated specific-heat ratio κ. The specific-heat ratio κ is a function of the sequentially calculated cylinder temperature T. The cylinder temperature T is a function of the initial cylinder temperature $T_0$ and the specific-heat ratio κ. Since the cylinder volume V is uniquely obtained from the crank angle CA, the initial cylinder volume $V_0$ and the final cylinder volume Vθ are replaced with the initial crank angle $CA_0$ and the final crank angle $CA_\theta$, respectively.

From the foregoing, the final cylinder pressure $P_\theta$ is obtained as a function of the initial cylinder pressure $P_0$, the initial cylinder temperature $T_0$, the initial crank angle $CA_0$, and the final crank angle $CA_\theta$ on the condition that the composition of the air-fuel mixture in Expression (2) is given.

The reference cylinder pressure map described earlier is based on the above-described relationships. As shown in FIG. 7, the intake pressure PBA, the initial cylinder temperature T_STRT, and the intake valve closing timing IVC corresponding to the initial cylinder pressure $P_0$, the initial cylinder temperature $T_0$, and the initial crank angle $CA_0$, respectively, and the reference crank angle CA_REF corresponding to the final crank angle $CA_\theta$ are input as input parameters, and the reference cylinder pressure P_REF corresponding to the final cylinder pressure $P_\theta$ is obtained as an output.

The condition that no external EGR gas is present, a condition concerning the amount of internal EGR, and the condition that the air-fuel ratio AF is the theoretical air-fuel ratio are given as conditions concerning the composition of the air-fuel mixture. The first condition is given because if external EGR is executed, there is a delay until arrival of external EGR gas at the cylinder 3a, and the amount of external EGR cannot be known. In contrast, internal EGR causes no delay, unlike external EGR, and the amount of internal EGR depends for the most part on the above-described initial conditions including the intake valve closing timing IVC. The amount of internal EGR is given as a condition.

More specifically, the ECU 2 calculates the amount of internal EGR in accordance with the intake pressure PBA, the initial cylinder temperature T_STRT, and the intake valve closing timing IVC through a simulation or the like. In Expression (2) described above, the number $n_{CO2}$ of moles of a $CO_2$ component which is an exhaust gas component and the number $n_{H_2O}$ of moles of a $H_2O$ component which is an exhaust gas component are set in accordance with the calculated amount of internal EGR, and the numbers $n_X$ of moles of other components are assigned in proportions corresponding to the theoretical air-fuel ratio. The reference cylinder pressure map is obtained by calculating in advance the reference cylinder pressure P_REF on the basis of Expressions (1) to (6) for various conditions concerning the above-described four input parameters on the above-described air-fuel mixture composition conditions and mapping a result of the calculation with respect to the input parameters.

Figure 10:
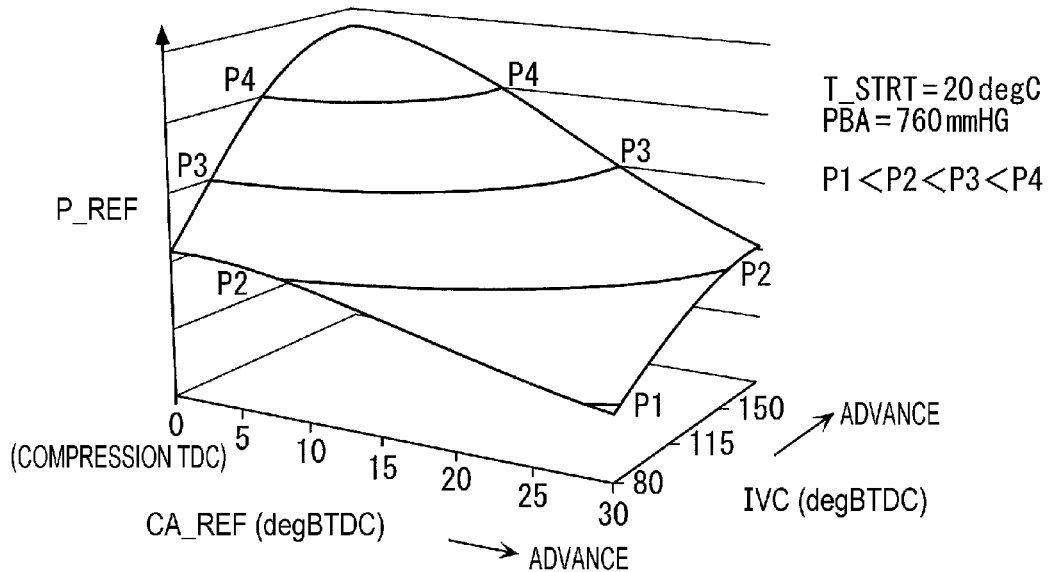
FIG. 10 is a chart showing an example in which the reference cylinder pressure is set with respect to the reference crank angle and intake valve closing timing in the reference cylinder pressure map.
Figure 11:
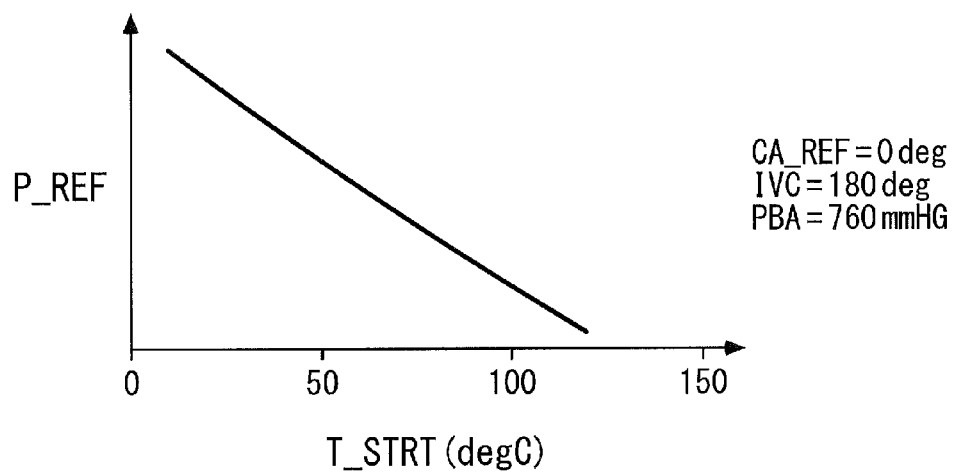
FIG. 11 is a chart showing an example in which the reference cylinder pressure is set with respect to an initial cylinder temperature in the reference cylinder pressure map.
Figure 12:
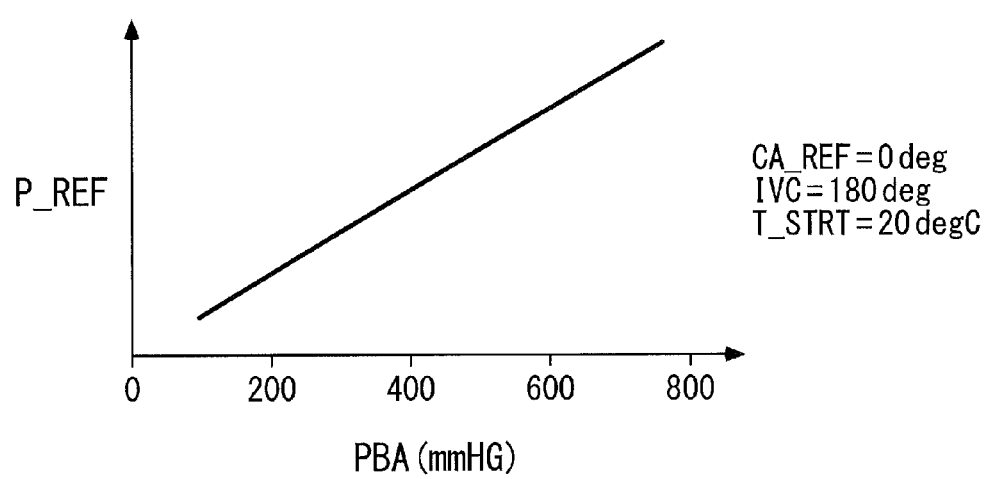
FIG. 12 is a chart showing an example in which the reference cylinder pressure is set with respect to an intake pressure in the reference cylinder pressure map.

FIGS. 10 to 12 each show an example in which the reference cylinder pressure P_REF is set with respect to the corresponding input parameter in the reference cylinder pressure map. As shown in FIG. 10, the reference cylinder pressure P_REF is set to increase in value with an approach of the reference crank angle CA_REF to 0, that is, with an approach of the reference crank angle CA_REF to the compression TDC. The reference cylinder pressure P_REF is also set to increase in value with an increase in the intake valve closing timing IVC, that is, with moving up of valve closing timing for the intake valve in the compression stroke. This is because a virtual compression period for the air-fuel mixture lengthens with an approach of the reference crank angle CA_REF to the compression TDC or with moving up of the valve closing timing for the intake valve, which increases a final cylinder pressure.

As shown in FIG. 11, the reference cylinder pressure P_REF is set to decrease in value with an increase in the initial cylinder temperature T_STRT. This is because the specific-heat ratio κ of the air-fuel mixture decreases with an increase in the cylinder temperature that increases with an increase in the initial cylinder temperature T_STRT, which results in a decrease in the degree of rise in cylinder pressure.

As shown in FIG. 12, the reference cylinder pressure P_REF is set to be proportional to the intake pressure PBA. This is because the reference cylinder pressure P_REF and the intake pressure PBA correspond to the final cylinder pressure $P_θ$ and the initial cylinder pressure $P_0$, respectively, and both pressures have a proportional relationship with each other (see Expression (6)).

As described earlier, in step 33 of FIG. 6, the ECU 2 calculates the reference cylinder pressure P_REF by searching across the reference cylinder pressure map in accordance with the above-described four parameters. In next step 34, the ECU 2 calculates a heat transfer correction coefficient K_HT by searching across a predetermined map in accordance with the engine speed NE and the engine water temperature TW. The heat transfer correction coefficient K_HT is intended to compensate for effects of heat exchanged between an interior and an exterior of the cylinder 3*a*.

The ECU 2 then calculates the final reference cylinder pressure P_REF by multiplying the reference cylinder pressure P_REF calculated in step 33 by the heat transfer correction coefficient K_HT (step 35) and ends the present process.

The process of calculating the AF coefficient C_AF to be executed in step 7 of FIG. 3 will be described with reference to FIG. 13. As described earlier, the AF coefficient C_AF is defined as the slope of the equivalence ratio KAF of the air-fuel mixture with respect to the pressure difference ΔP (the difference between the actual cylinder pressure P_CPS and the reference cylinder pressure P_REF) (see FIG. 5) and is used to calculate the air-fuel ratio AF. Since the property that the slope varies with intake and compression conditions is found, the AF coefficient C_AF is calculated in the present process.

In the present process, in step 41, the ECU 2 acquires the reference crank angle CA_REF, the intake valve closing timing IVC, the initial cylinder temperature T_STRT, and the intake pressure PBA. These parameters indicate the above-described intake and compression conditions and are the same as the four input parameters of the reference cylinder pressure map described earlier. For this reason, the acquirement of the parameters in step 41 is performed by reading out pieces of data obtained by the process of calculating the reference cylinder pressure P_REF in FIG. 6.

Figure 14:
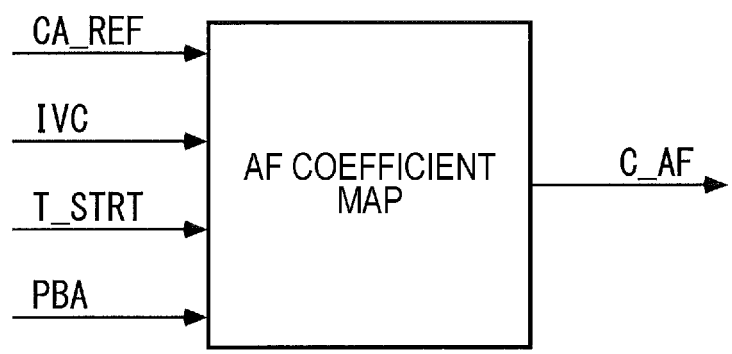
FIG. 14 is a chart showing an input-output relation of an AF coefficient map.

The ECU 2 then calculates the AF coefficient C_AF by searching across an AF coefficient map shown in FIG. 14 in accordance with the acquired four parameters (step 42) and ends the present process. The AF coefficient map is obtained by calculating in advance the AF coefficient C_AF on the basis of Expression (1) to (6) for various conditions concerning the above-described four input parameters and mapping a result of the calculation with respect to the input parameters.

Figure 15:
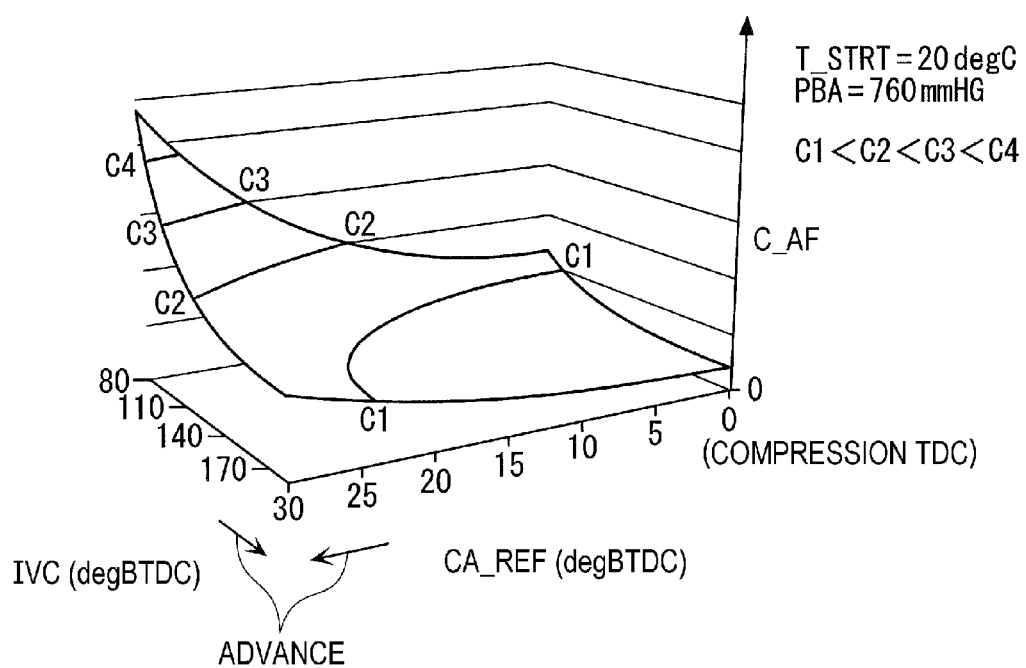
FIG. 15 is a chart showing an example in which the AF coefficient is set with respect to the reference crank angle and the intake valve closing timing in the AF coefficient map.
Figure 16:
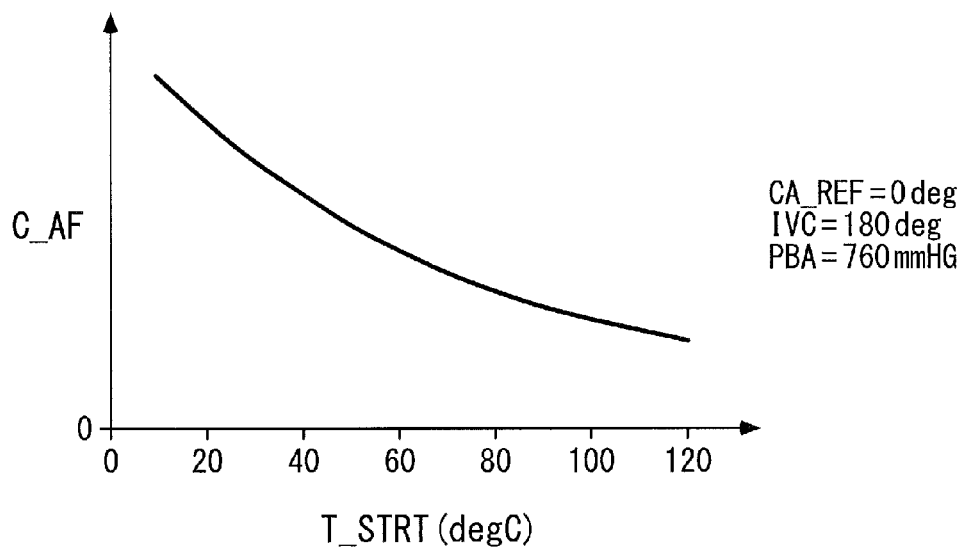
FIG. 16 is a chart showing an example in which the AF coefficient is set with respect to the initial cylinder temperature in the AF coefficient map.
Figure 17:
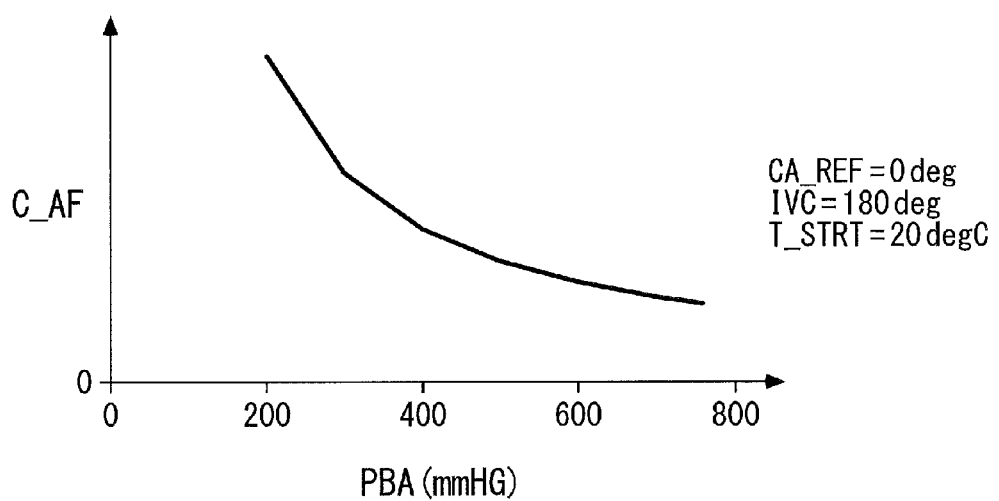
FIG. 17 is a chart showing an example in which the AF coefficient is set with respect to the intake pressure in the AF coefficient map.

FIGS. 15 to 17 each show an example in which the AF coefficient C_AF is set with respect to the corresponding input parameter in the AF coefficient map. As shown in FIG. 15, the AF coefficient C_AF is set to decrease in value with an approach of the reference crank angle CA_REF to the compression TDC or with moving up of the valve closing timing for the exhaust valve in the compression stroke. This is because the virtual compression period for the air-fuel mixture lengthens with an approach of the reference crank angle CA_REF to the compression TDC or with moving up of the valve closing timing for the intake valve, which increases the pressure difference ΔP. The AF coefficient C_AF decreases with the increase.

As shown in FIG. 16, the AF coefficient C_AF is set to decrease in value with an increase in the initial cylinder temperature T_STRT. This is for the reason below. A fuel of components of the air-fuel mixture is larger in variation in the specific heat $C_p$ at constant pressure with temperature than other components and makes a large contribution to the temperature property (or the temperature characteristics) of the specific-heat ratio κ of the air-fuel mixture. An increase in the air-fuel ratio AF is accompanied by a decrease in the proportion of the fuel and a decrease in the contribution of the fuel. This reduces the degree of variation in the specific-heat ratio κ with temperature. For this reason, if the initial cylinder temperature T_STRT is higher, the specific-heat ratio κ varies at a higher level during compression, and the pressure difference ΔP increases, which reduces the AF coefficient C_AF.

As shown in FIG. 17, the AF coefficient C_AF is set to decrease in value with an increase in the intake pressure PBA. This is because the actual cylinder pressure P_CPS and the pressure difference ΔP increase in proportion to an increase in the intake pressure PBA that is an initial cylinder pressure, and the AF coefficient C_AF decreases with the increase.

Figure 18:
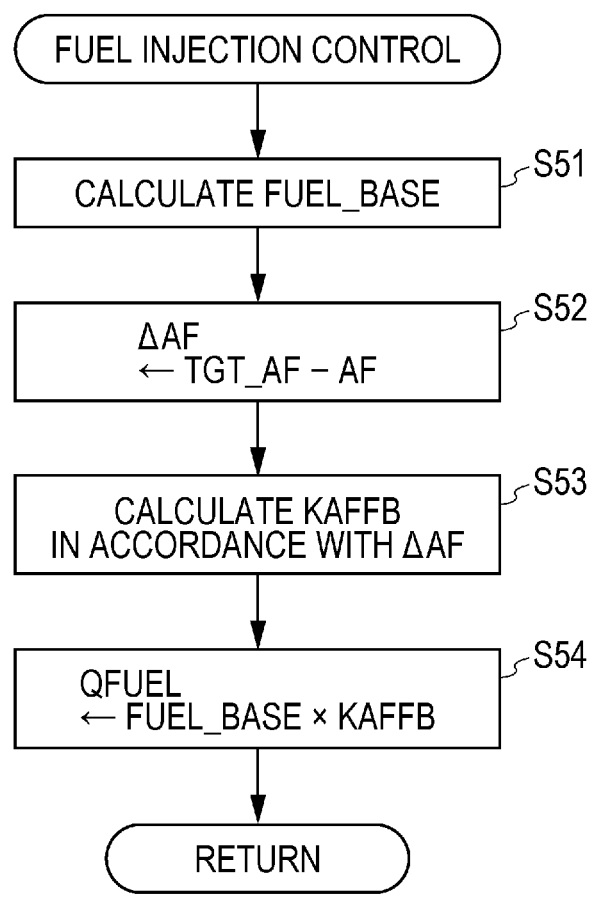
FIG. 18 is a flowchart showing a fuel injection control process using the air-fuel ratio.

A fuel injection control process using the estimated air-fuel ratio AF of the air-fuel mixture will be described with reference to FIG. 18. The present process is executed for each cylinder 3*a* in synchronization with generation of a TDC signal.

In the present process, in step 51, a basic fuel injection quantity FUEL_BASE is calculated by searching across a predetermined map (not shown) in accordance with the engine speed NE and request torque TRQCMD. The above-described request torque TRQCMD is calculated on the basis of, for example, the accelerator position AP and the engine speed NE.

A deviation ΔAF of the estimated air-fuel ratio AF from a target air-fuel ratio TGT_AF set at the time is then calculated (step 52). Note that the target air-fuel ratio TGT_AF is generally set to the theoretical air-fuel ratio when the engine 3 is in a steady operation state except at the time of acceleration (at full throttle) and the like.

An air-fuel ratio correction efficient KAFFB is then calculated in accordance with the calculated deviation ΔAF through PID feedback control or the like such that an actual equivalence ratio KACT converges on a target equivalence ratio KCMD (step 53). Note that the calculation of the air-fuel ratio correction efficient KAFFB may be performed using a modern control theory, such as a self-tuning regulator (STR). Finally, a fuel injection quantity QFUEL is calculated by multiplying the basic fuel injection quantity FUEL_BASE by the air-fuel ratio correction efficient KAFFB (step 54) and the present process ends. With the above-described control, the air-fuel ratio AF of the air-fuel mixture is controlled to be the target air-fuel ratio TGT_AF.

As described above, according to the present embodiment, the reference cylinder pressure P_REF generated at the reference crank angle CA_REF is calculated on the basis of the temperature property of the specific-heat ratio κ of the air-fuel mixture on the predetermined air-fuel mixture composition conditions that no external EGR gas is present and that an air-fuel ratio is a theoretical air-fuel ratio. Since the air-fuel ratio AF of the air-fuel mixture is calculated on the basis of the pressure difference ΔP between the actual cylinder pressure P_CPS and the reference cylinder pressure P_REF that are detected at the reference crank angle CA_REF, the air-fuel ratio AF can be estimated while the temperature property of the specific-heat ratio κ of the air-fuel mixture is reflected.

Since the reference crank angle CA_REF is a crank angle immediately before combustion of the air-fuel mixture is started, it is possible to acquire the actual cylinder pressure P_CPS in a state where combustion is not yet performed and a change in the status of the air-fuel mixture is kept being a polytropic change and secure the large pressure difference ΔP between the actual cylinder pressure P_CPS and the reference cylinder pressure P_REF. Thus, the air-fuel ratio AF can be estimated with high accuracy while the temperature property of the specific-heat ratio κ of the air-fuel mixture is satisfactorily reflected on the basis of the pressure difference ΔP. Fuel injection control can be appropriately performed using the air-fuel ratio AF estimated with high accuracy.

Additionally, since the reference crank angle CA_REF is set using the ignition timing IGLOG, the intake pressure PBA, and the engine speed NE, the setting can be appropriately performed in accordance with the actual operational status of the engine 3, and the reference cylinder pressure P_REF and the actual cylinder pressure P_CPS immediately before combustion of the air-fuel mixture is started can be appropriately obtained.

Since the set reference crank angle CA_REF is limited to 0 degrees corresponding to the compression TDC if the reference crank angle CA_REF is closer to the retard side than 0 degrees, a drop in the actual cylinder pressure P_CPS due to effects of, for example, knocking after the compression TDC is avoided. The large pressure difference ΔP between the actual cylinder pressure P_CPS and the reference cylinder pressure P_REF can be secured, and the accuracy of estimation of the air-fuel ratio AF can be maintained high.

Since the reference cylinder pressure P_REF is calculated in accordance with the reference crank angle CA_REF, the intake valve closing timing IVC corresponding to the initial crank angle at the start of compression, the initial cylinder temperature T_STRT, and the intake pressure PBA corresponding to the initial cylinder pressure, the reference cylinder pressure can be calculated with high accuracy in accordance with a status in temperature and pressure of the air-fuel mixture during compression. Additionally, effects of heat exchanged between the interior and the exterior of the cylinder 3a can be appropriately compensated for by correcting the calculated reference cylinder pressure P_REF in accordance with the engine speed NE and the engine water temperature TW.

It is possible to appropriately calculate the AF coefficient C_AF while reflecting the air-fuel mixture intake and compression conditions in accordance with the four same parameters (the reference crank angle CA_REF, the intake valve closing timing IVC, the initial cylinder temperature T_STRT, and the intake pressure PBA) as those used to calculate the reference cylinder pressure P_REF. Estimation of the air-fuel ratio AF can be performed with high accuracy on the basis of a value obtained by multiplying the pressure difference ΔP by the calculated AF coefficient C_AF.

Additionally, the pressure detection element and the amplifier circuit of the cylinder pressure sensor 51 are provided integrally with the injector 4. Thus, the cylinder pressure sensor 51 is unlikely to be affected by noise due to ignition operation and noise due to injection operation of the injector 4 of the different cylinder 3a. For this reason, the accuracy of detecting the actual cylinder pressure P_CPS by the cylinder pressure sensor 51 is enhanced, which allows further improvement in the accuracy of estimation of the air-fuel ratio AF.

Figure 19:
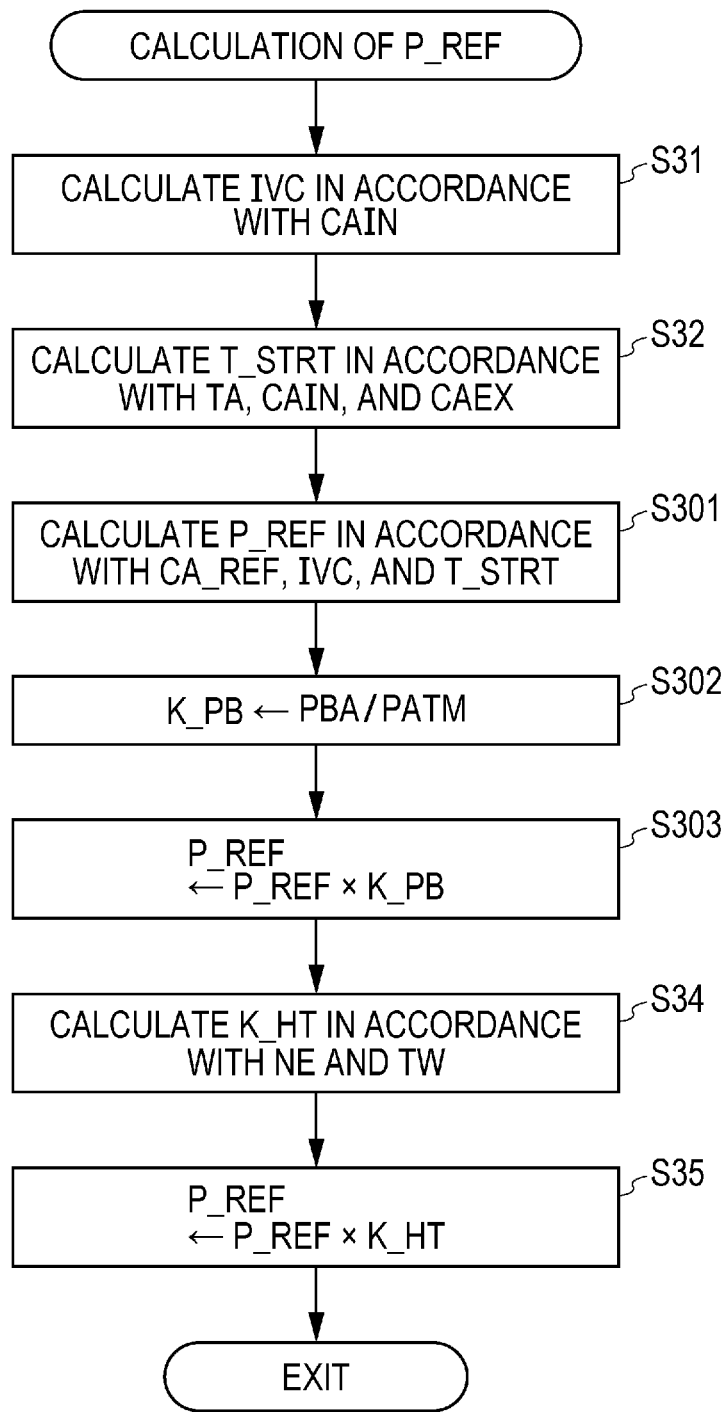
FIG. 19 shows a subroutine representing a process of calculating the reference cylinder pressure according to a modification.

A modification of the process of calculating the reference cylinder pressure P_REF will be described with reference to FIG. 19. The modification is configured such that the intake pressure PBA is excluded from the list of input parameters of the reference cylinder pressure map on the basis of the proportional relationship described earlier (FIG. 12) of the reference cylinder pressure P_REF with the intake pressure PBA and such that a map value obtained from a reference cylinder pressure map is corrected with the intake pressure PBA. The present process is executed instead of the process in FIG. 6. Steps in FIG. 19 which are the same in execution details as those in FIG. 6 are denoted by the same step numbers.

Figure 6:
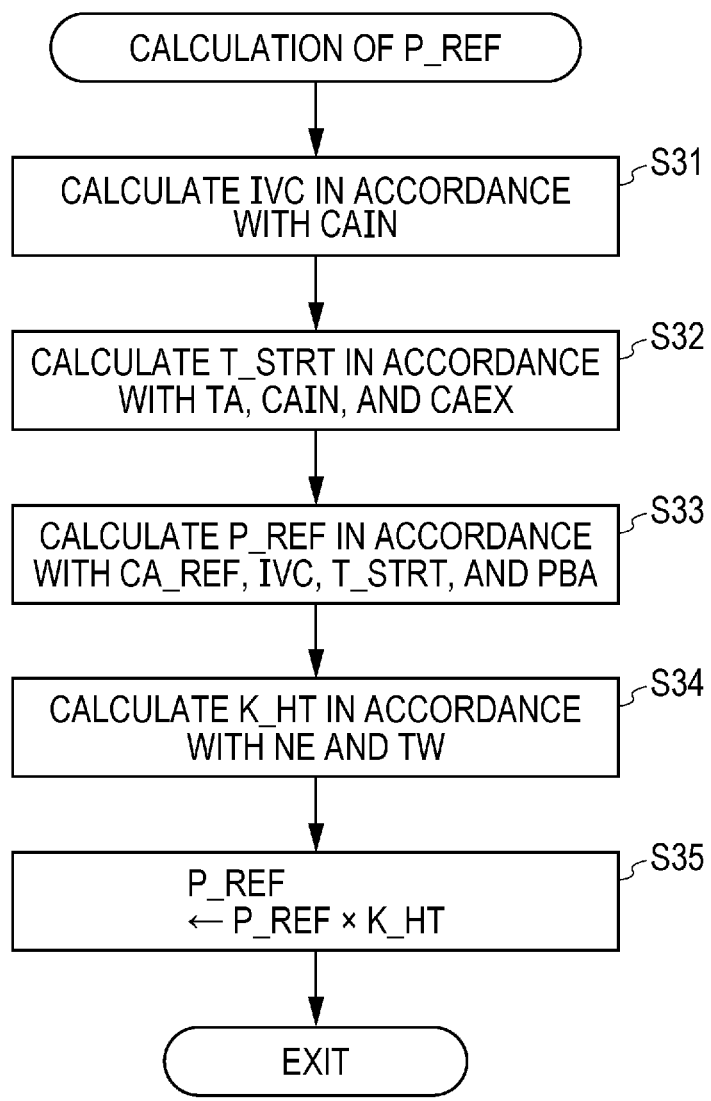
FIG. 6 shows a subroutine representing a process of calculating a reference cylinder pressure according to the first embodiment.

In the present process, step 31 and step 32 that are the same as those in the process in FIG. 6 are executed, and the intake valve closing timing IVC and the initial cylinder temperature T_STRT are calculated. The reference cylinder pressure P_REF is then calculated by searching across a reference cylinder pressure map (not shown) in accordance with the reference crank angle CA_REF, the intake valve closing timing IVC, and the initial cylinder temperature T_STRT (step 301). Note that, in the reference cylinder pressure map, the initial cylinder pressure at the start of compression is treated as a constant, and a reference atmospheric pressure PATM (760 mmHg) is used.

A value obtained by dividing the intake pressure PBA by the reference atmospheric pressure PATM is set as an intake pressure correction coefficient K_PB (step 302), and the reference cylinder pressure P_REF calculated in step 301 is multiplied by the intake pressure correction coefficient K_PB to calculate the corrected reference cylinder pressure P_REF (step 303).

The details of subsequent processes are the same as in FIG. 6. The final reference cylinder pressure P_REF is calculated by multiplying the reference cylinder pressure P_REF calculated in step 303 by the heat transfer correction coefficient K_HT calculated in accordance with the engine speed NE and the engine water temperature TW (steps 34 and 35), and the present process is ended.

According to the above-described modification, the reference cylinder pressure P_REF equivalent to that in the calculation process in FIG. 6 can be calculated. In addition, the reference cylinder pressure map can be easily created due to the decrease in the number of input parameters, and the load of the creation can be reduced.

Figure 20:
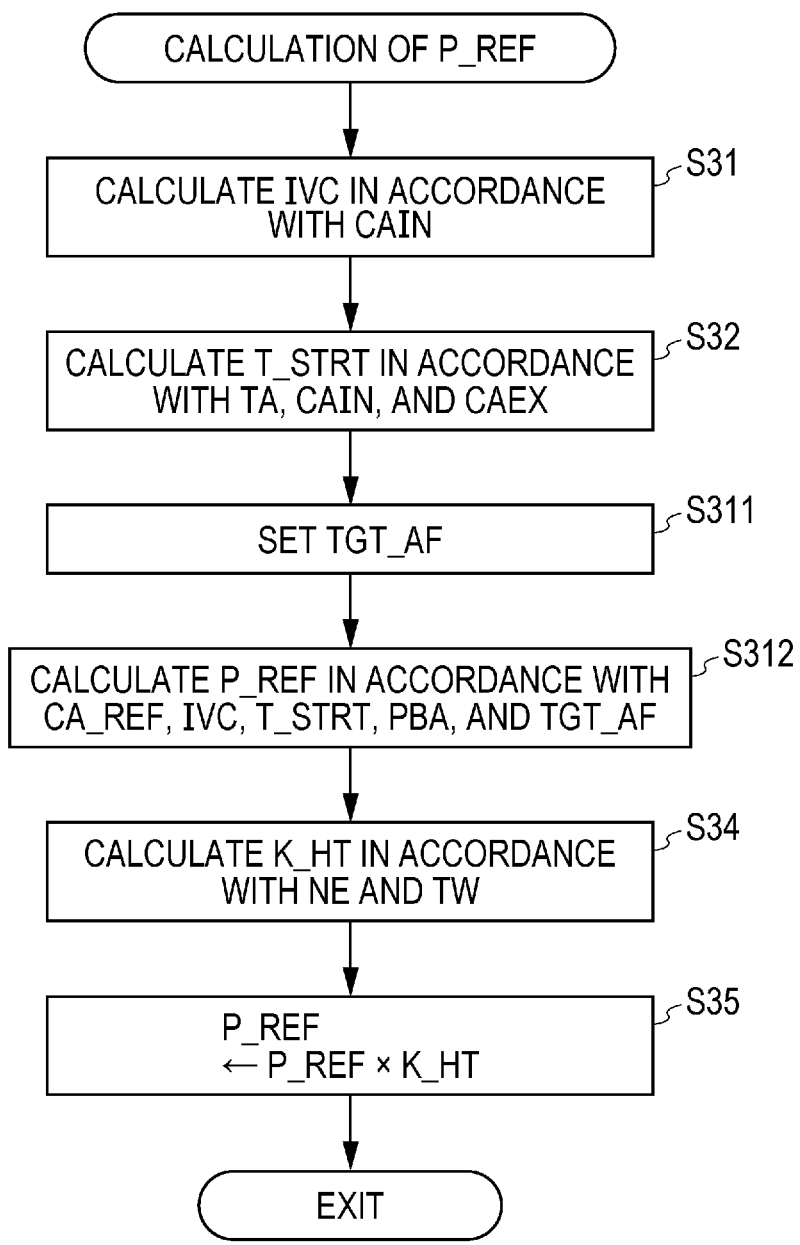
FIG. 20 shows a subroutine representing a process of calculating a reference cylinder pressure according to a second embodiment.

A process of calculating a reference cylinder pressure P_REF according to a second embodiment will be described with reference to FIG. 20. In the calculation process (FIG. 6) according to the above-described first embodiment, the air-fuel ratio AF is the theoretical air-fuel ratio. In contrast, the calculation process in FIG. 20 is intended to calculate the reference cylinder pressure P_REF on the condition that an air-fuel ratio AF is a target air-fuel ratio TGT_AF. Note that steps in FIG. 20 which are the same in execution details as those in FIG. 6 are denoted by the same step numbers.

In the present process, step 31 and step 32 that are the same as in the process in FIG. 6 are executed, and intake valve closing timing IVC and an initial cylinder temperature T_STRT are calculated.

The target air-fuel ratio TGT_AF is then set (step 311). The setting of the target air-fuel ratio TGT_AF is performed by searching across a predetermined map (not shown) in accordance with request torque TRQCMD and an engine speed NE. For example, if an engine 3 is operated while switching between stoichiometric combustion mode, in which the air-fuel ratio AF is controlled to be close to a theoretical air-fuel ratio, and lean combustion mode, in which the air-fuel ratio AF is controlled to be considerably leaner than the theoretical air-fuel ratio, in accordance with, for example, the load on the engine 3, the target air-fuel ratio TGT_AF is set to cover a wide range in accordance with the combustion modes.

Figure 21:
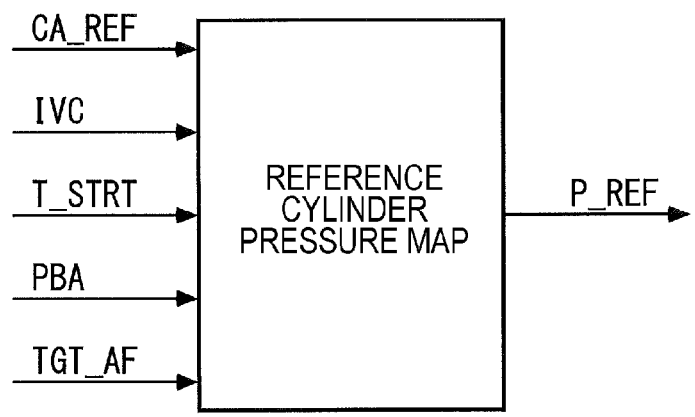
FIG. 21 is a chart showing an input-output relation of a reference cylinder pressure map used in the calculation process in FIG. 20.

The reference cylinder pressure P_REF is then calculated by searching across a reference cylinder pressure map shown in FIG. 21 in accordance with a reference crank angle CA_REF, the intake valve closing timing IVC, the initial cylinder temperature T_STRT, an intake pressure PBA, and the target air-fuel ratio TGT_AF set in step 311 (step 312). The reference cylinder pressure map is different from the reference cylinder pressure map in FIG. 7 in that the target air-fuel ratio TGT_AF is added as an input parameter. With the addition, the condition that the air-fuel ratio AF is the target air-fuel ratio TGT_AF is given, and the number $n_X$ of moles of each component in Expression (2) is defined from the condition, the condition that no external EGR gas is present, and a condition concerning the amount of internal EGR.

The reference cylinder pressure map is obtained by calculating in advance the reference cylinder pressure P_REF on the basis of Expressions (1) to (6) for various conditions concerning the above-described five input parameters and mapping a result of the calculation with respect to the input parameters.

Figure 22:
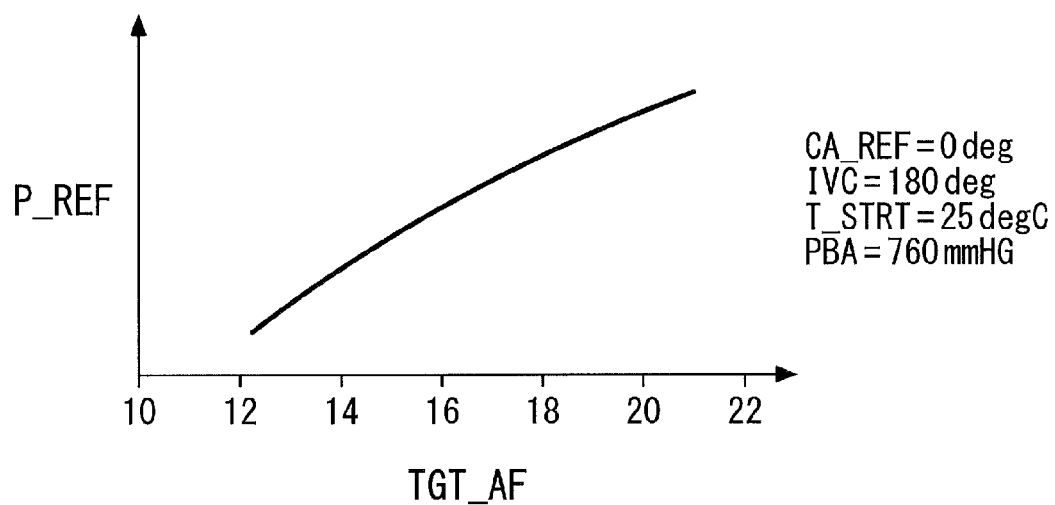
FIG. 22 is a chart showing an example in which a reference cylinder pressure is set with respect to a target air-fuel ratio in the reference cylinder pressure map in FIG. 21.

FIG. 22 shows an example in which the reference cylinder pressure P_REF is set with respect to the target air-fuel ratio TGT_AF in the reference cylinder pressure map. As shown in FIG. 22, the reference cylinder pressure P_REF is set to increase in value with an increase in the target air-fuel ratio TGT_AF. This is because a specific-heat ratio κ of an air-fuel mixture increases with an increase in air-fuel ratio (see FIG. 9), and a final cylinder pressure increases with the increase.

Referring back to FIG. 20, processing details after step 312 are the same as in FIG. 6. The final reference cylinder pressure P_REF is calculated by multiplying the calculated reference cylinder pressure P_REF by a heat transfer correction coefficient K_HT (steps 34 and 35), and the present process is ended. Note that since the reference cylinder pressure P_REF is calculated on a condition concerning the target air-fuel ratio TGT_AF in the present embodiment, if the actual air-fuel ratio AF is the target air-fuel ratio TGT_AF, an actual cylinder pressure P_CPS coincides with the reference cylinder pressure P_REF, and a pressure difference ΔP is 0. From the relationship, calculation of an equivalence ratio KAF in step 11 of FIG. 3 is performed by Expression (C) below instead of Expression (A).

$$KAF = \Delta P \times C\_AF + KTGT \tag{C}$$

Reference character KTGT on the right side denotes an equivalence ratio corresponding to the target air-fuel ratio TGT_AF.

As described above, according to the present embodiment, the reference cylinder pressure P_REF can be appropriately calculated in accordance with the reference crank angle CA_REF, the intake valve closing timing IVC, the initial cylinder temperature T_STRT, and the intake pressure PBA, like the first embodiment. Since the reference cylinder pressure P_REF is calculated in accordance with the target air-fuel ratio TGT_AF on the condition that the air-fuel ratio AF is the target air-fuel ratio TGT_AF, even if the target air-fuel ratio TGT_AF is changed, the reference cylinder pressure P_REF can be appropriately calculated using, as a reference, the target air-fuel ratio TGT_AF that is a target value for the air-fuel ratio AF at the time.

Note that the present disclosure is not limited to the described embodiments and can be carried out in various aspects. For example, the ignition timing IGLOG, the intake pressure PBA, and the engine speed NE are used as parameters in calculating the reference crank angle CA_REF in the embodiments. However, any other appropriate parameters may be used in combination.

The initial cylinder temperature T_STRT used to calculate the reference cylinder pressure R_REF and the AF coefficient C_AF is calculated in accordance with the intake temperature TA, the intake phase CAIN, and the exhaust phase CAEX in the embodiments. If internal EGR using valve overlap between the intake and exhaust valves is not executed, the intake temperature TA may be used as an initial cylinder temperature without any processing. Additionally, although the intake pressure PBA is used as an initial cylinder pressure, the cylinder pressure PCYL detected by the cylinder pressure sensor 51 at the start of compression may be used.

Although the reference cylinder pressure P_REF is corrected in accordance with the engine speed NE and the engine water temperature TW, correction may be performed additionally using any appropriate parameter that affects heat exchange between the interior and the exterior of the cylinder 3*a*.

The embodiments are examples in which the engine 3 has no external EGR device. The present disclosure can also be applied to a case where the engine 3 has an external EGR device. That is, in this case, the reference cylinder pressure P_REF is calculated on the condition that no external EGR gas is present in an air-fuel mixture, and the actual cylinder pressure P_CPS is sampled while external EGR is stopped. Like the embodiments, the air-fuel ratio AF can be estimated with high accuracy.

In the embodiments, fuel injection control is executed in accordance with the estimated air-fuel ratio AF. Instead of or in addition to this, any other engine control, such as EGR control via an EGR valve 42, suction air amount control via the throttle valve 27, or ignition timing control via the ignition plug 5, may be executed. Although the cylinder pressure sensor 51 is of the type that is integral with the injector 4, the cylinder pressure sensor 51 may, of course, be of the separate type that is arranged separate from the injector 4.

Additionally, in the embodiments, the engine 3 is an engine for a vehicle. The present disclosure can also be applied to an engine for a different purpose, such as an engine for an outboard motor in which a crankshaft is arranged in a vertical direction. The detailed configuration can be appropriately changed within the scope of the present disclosure.

According to a first aspect of the present disclosure, there is provided an internal combustion engine control apparatus for estimating an air-fuel ratio of an air-fuel mixture, with which a cylinder 3a is filled, and controlling an internal combustion engine 3 using the estimated air-fuel ratio, the control apparatus including a cylinder pressure sensor 51 that detects a pressure in the cylinder 3a as a cylinder pressure PCYL, an operational status detection unit (an intake pressure sensor 56, a crank angle sensor 52, and an ECU 2) that detects an operational status (ignition timing IGLOG, an intake pressure PBA, and an engine speed NE) of the internal combustion engine 3, a reference crank angle setting unit (the ECU 2, step 5 in FIG. 3, and FIG. 4) that sets, as a reference crank angle CA_REF, a crank angle immediately before combustion of the air-fuel mixture is started in accordance with the detected operational status of the internal combustion engine 3, a reference cylinder pressure calculation unit (the ECU 2, step 6 in FIG. 3, FIG. 6, FIG. 19, and FIG. 20) that calculates, as a reference cylinder pressure P_REF, a pressure in the cylinder 3a generated at the set reference crank angle CA_REF on a basis of a temperature property of a specific-heat ratio of the air-fuel mixture on the conditions that no external EGR gas derived from an exhaust reflux is present in the air-fuel mixture and that an air-fuel ratio AF of the air-fuel mixture is a predetermined air-fuel ratio, an air-fuel ratio estimation unit (the ECU 2 and steps 9 to 11 in FIG. 3) that estimates the air-fuel ratio AF of the air-fuel mixture on a basis of a pressure difference ΔP between an actual cylinder pressure P_CPS detected at the reference crank angle CA_REF by the cylinder pressure sensor 51 and the calculated reference cylinder pressure P_REF, and a control unit (the ECU 2 and FIG. 18) that controls the internal combustion engine 3 in accordance with the estimated air-fuel ratio AF of the air-fuel mixture.

In the internal combustion engine control apparatus according to the present disclosure, the cylinder pressure (the pressure in the cylinder) is detected by the cylinder pressure sensor. The crank angle immediately before the combustion of the air-fuel mixture is started is set as the reference crank angle in accordance with the detected operational status of the internal combustion engine, and the pressure in the cylinder generated at the reference crank angle is calculated as the reference cylinder pressure. The calculation of the reference cylinder pressure is performed on the basis of the temperature property of the specific-heat ratio of the air-fuel mixture on the conditions that no external EGR gas is present in the air-fuel mixture and that the air-fuel ratio of the air-fuel mixture is the predetermined air-fuel ratio.

As described earlier, the specific-heat ratio of the air-fuel mixture is basically defined in accordance with composition of the air-fuel mixture and has the temperature property of varying with a temperature of the air-fuel mixture. If external EGR is executed, since a flow path to the cylinder is long, and there is a delay until arrival of external EGR gas at an interior of the cylinder, the amount of external EGR cannot be known. Thus, by calculating the reference cylinder pressure on the basis of the temperature property of the specific-heat ratio on the predetermined air-fuel mixture composition conditions that no EGR gas is present and that the air-fuel ratio is the predetermined air-fuel ratio, it is possible to uniquely and appropriately obtain the reference cylinder pressure while reflecting the temperature property of the specific-heat ratio of the air-fuel mixture.

According to the present disclosure, a cylinder pressure detected at the reference crank angle is obtained as the actual cylinder pressure, and the air-fuel ratio is estimated on the basis of the pressure difference between the actual cylinder pressure and the reference cylinder pressure. An actual air-fuel ratio and composition of the air-fuel mixture and a variation in the specific-heat ratio or temperature corresponding thereto are reflected in the actual cylinder pressure. Thus, the air-fuel ratio can be estimated on the basis of the pressure difference between the actual cylinder pressure and the reference cylinder pressure.

The reference crank angle is a crank angle immediately before the combustion of the air-fuel mixture is started and is set in accordance with the detected operational status of the internal combustion engine. With this setting of the reference crank angle, it is possible to acquire the actual cylinder pressure in a state where combustion is not yet performed and a change in a status of the air-fuel mixture is kept being a polytropic change and to secure the large pressure difference between the actual cylinder pressure and the reference cylinder pressure. Thus, the air-fuel ratio of the air-fuel mixture can be estimated with high accuracy while the temperature property of the specific-heat ratio is satisfactorily reflected on the basis of the pressure difference. The internal combustion engine can be appropriately controlled in accordance with the air-fuel ratio estimated with high accuracy.

According to a second aspect of the present disclosure, in the internal combustion engine control apparatus of the first aspect, the operational status detection unit may detect, as the operational status of the internal combustion engine 3, the ignition timing IGLOG, a pressure (the intake pressure PBA) of intake air to be sucked into the cylinder 3a, and the speed NE of the internal combustion engine 3, and the reference crank angle setting unit may set the reference crank angle CA_REF in accordance with the detected ignition timing IGLOG, the detected intake air pressure, and the detected speed NE of the internal combustion engine 3 (FIG. 4).

As described earlier, the reference crank angle is set as a crank angle immediately before the combustion of the air-fuel mixture is started. Timing for starting combustion of the air-fuel mixture is directly affected by the ignition timing and varies with the intake air pressure. If the timing is expressed as a crank angle, the timing varies with the speed of the internal combustion engine. With this configuration, the reference crank angle is set in accordance with the detected three parameters. The setting of the reference crank angle can be appropriately performed in accordance with an actual operational status of the internal combustion engine, and the reference cylinder pressure and the actual cylinder pressure immediately before the combustion of the air-fuel mixture is started can be appropriately obtained. Note that "detection" of various parameters in the present specification subsumes estimation of a parameter by computation in addition to direct detection of a parameter by a sensor or the like.

According to a third aspect of the present disclosure, in the internal combustion engine control apparatus of the second aspect, the reference crank angle setting unit may limit the set reference crank angle CA_REF to a crank angle (0 degrees) corresponding to a compression TDC if the reference crank angle CA_REF is closer to a retard side than the compression TDC (steps 23 and 24 in FIG. 4).

Figure 23:
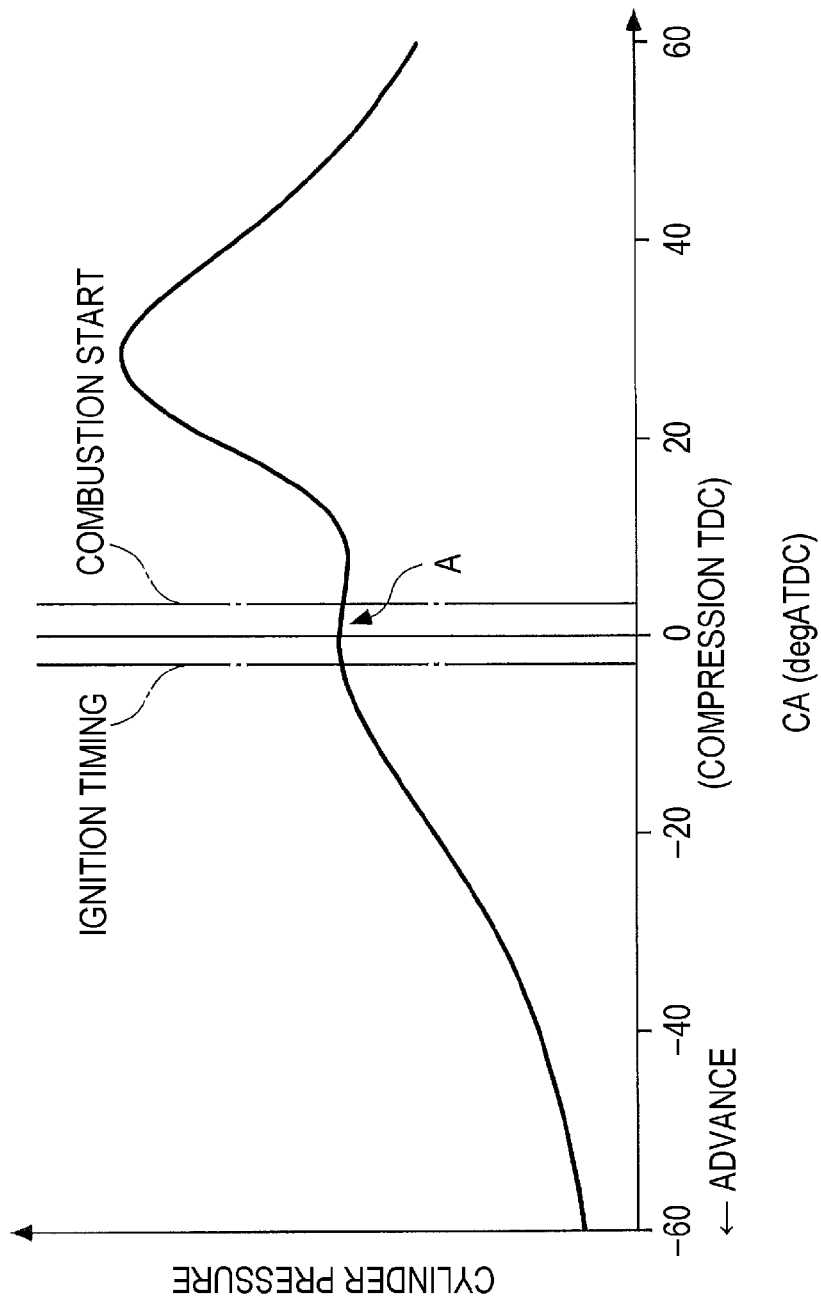
FIG. 23 is a chart showing an example of the relationship between a crank angle in the vicinity of a compression TDC and an actual cylinder pressure.

For example, if the ignition timing is closer to an advance side than the compression TDC, and timing for starting combustion of the air-fuel mixture is closer to the retard side than the compression TDC, as shown in FIG. 23, the actual cylinder pressure may drop between the compression TDC and the start of the combustion (a portion indicated by an arrow A in FIG. 23) mainly due to effects of knocking. If the reference crank angle is set closer to the retard side than the compression TDC in such a case, the actual cylinder pressure detected at the reference crank angle may drop. The large pressure difference between the actual cylinder pressure and the reference cylinder pressure cannot be secured, and the accuracy of estimation of the air-fuel ratio based on the pressure difference may drop.

According to the above-described configuration, if the reference crank angle set in the manner described earlier is closer to the retard side than the compression TDC, the reference crank angle is limited to the crank angle corresponding to the compression TDC. This avoids a drop in the actual cylinder pressure due to effects of, for example, knocking after the compression TDC. The large pressure difference between the actual cylinder pressure and the reference cylinder pressure can be secured, and the accuracy of estimation of the air-fuel ratio can be maintained high.

According to a fourth aspect of the present disclosure, the internal combustion engine control apparatus of any one of the first to third aspects may further include an initial crank angle acquisition unit (an intake phase sensor 53 and the ECU 2) that acquires, as an initial crank angle (intake valve closing timing IVC), a crank angle at a compression start time when compression of the air-fuel mixture is started in a compression stroke, an initial cylinder temperature acquisition unit (an intake temperature sensor 57, an intake phase sensor 53, an exhaust phase sensor 54, the ECU 2, and step 32 in FIG. 6) that acquires, as an initial cylinder temperature T_STRT, a temperature in the cylinder 3a at the compression start time, and an initial cylinder pressure acquisition unit (the intake pressure sensor 56) that acquires, as an initial cylinder pressure (the intake pressure PBA), a pressure in the cylinder 3a at the compression start time, in which the reference cylinder pressure calculation unit may calculate the reference cylinder pressure P_REF on a basis of the temperature property of the specific-heat ratio of the air-fuel mixture in accordance with the reference crank angle CA_REF, the acquired initial crank angle, the acquired initial cylinder temperature T_STRT, and the acquired initial cylinder pressure on the condition that the predetermined air-fuel ratio is a theoretical air-fuel ratio (step 33 in FIG. 6).

Since the reference cylinder pressure is a cylinder pressure generated at the reference crank angle corresponding to a time immediately before the combustion of the air-fuel mixture is started, the reference cylinder pressure varies with the reference crank angle and varies with timing for starting compression of the air-fuel mixture and a temperature and a pressure of the air-fuel mixture at the compression start time. Since when the air-fuel ratio varies, composition of the air-fuel mixture varies, and the specific-heat ratio varies, the reference cylinder pressure varies with the air-fuel ratio. From the above-described relationships, according to this configuration, since the reference cylinder pressure is calculated in accordance with the reference crank angle, and the initial crank angle, the initial cylinder temperature, and the initial cylinder pressure at the compression start time, the reference cylinder pressure can be calculated with high accuracy in accordance with a status in temperature and pressure of the air-fuel mixture during compression. Additionally, since the condition that the air-fuel ratio is the theoretical air-fuel ratio is adopted, the reference cylinder pressure can be appropriately calculated using, as a reference, the theoretical air-fuel ratio that is generally set as a target in air-fuel ratio control.

According to a fifth aspect of the present disclosure, the internal combustion engine control apparatus of any one of the first to third aspects may further include an initial crank angle acquisition unit (the intake phase sensor 53 and the ECU 2) that acquires, as an initial crank angle (the intake valve closing timing IVC), a crank angle at a compression start time when compression of the air-fuel mixture is started in a compression stroke, an initial cylinder temperature acquisition unit (the intake temperature sensor 57, the intake phase sensor 53, the exhaust phase sensor 54, the ECU 2, and step 32 in FIG. 6) that acquires, as the initial cylinder temperature T_STRT, a temperature in the cylinder 3a at the compression start time, an initial cylinder pressure acquisition unit (the intake pressure sensor 56) that acquires, as an initial cylinder pressure (the intake pressure PBA), a pressure in the cylinder 3a at the compression start time, and a target air-fuel ratio setting unit (the ECU 2 and step 311 in FIG. 20) that sets a target air-fuel ratio TGT_AF as a target for the air-fuel ratio AF of the air-fuel mixture, in which the predetermined air-fuel ratio may be the set target air-fuel ratio TGT_AF, the reference cylinder pressure calculation unit may calculate the reference cylinder pressure P_REF on a basis of the temperature property of the specific-heat ratio of the air-fuel mixture in accordance with the reference crank angle CA_REF, the acquired initial crank angle, the acquired initial cylinder temperature T_STRT, the acquired initial cylinder pressure, and the set target air-fuel ratio TGT_AF on the condition that the predetermined air-fuel ratio is the target air-fuel ratio TGT_AF (step 312 in FIG. 20).

According to the above-described configuration, the reference cylinder pressure is calculated in accordance with the reference crank angle, and the initial crank angle, the initial cylinder temperature, and the initial cylinder pressure at the compression start time, as in the third aspect. This allows appropriate calculation of the reference cylinder pressure. The condition that the air-fuel ratio is the target air-fuel ratio is adopted, and the reference cylinder pressure is calculated in accordance with the target air-fuel ratio. For this reason, even if the target air-fuel ratio is changed, the reference cylinder pressure can be appropriately calculated using, as a reference, the target air-fuel ratio as a target value for the air-fuel ratio at the time.

According to a sixth aspect of the present disclosure, the internal combustion engine control apparatus of the fourth or fifth aspect may further include a speed detection unit (the crank angle sensor 52) that detects the speed NE of the internal combustion engine 3 and a cooling water temperature detection unit (a water temperature sensor 59) that detects a temperature TW of cooling water which cools the internal combustion engine 3, in which the reference cylinder pressure calculation unit may correct the reference cylinder pressure P_REF in accordance with the detected speed NE of the internal combustion engine 3 and the detected temperature TW of the cooling water (steps 34 and 35 in FIG. 6).

According to the above-described configuration, effects of heat exchanged between an interior and an exterior of the cylinder can be appropriately compensated for by correcting the reference cylinder pressure in accordance with the detected speed of the internal combustion engine and the temperature of the cooling water.

Figure 13:
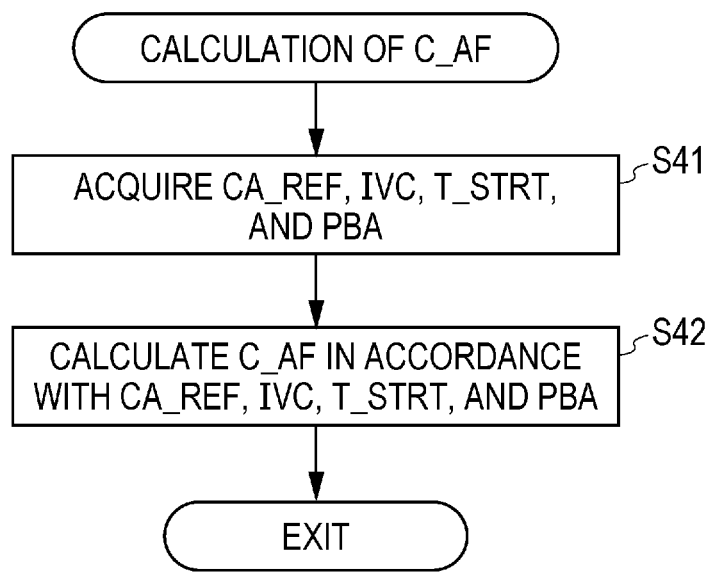
FIG. 13 shows a subroutine representing a process of calculating an AF coefficient.

According to a seventh aspect of the present disclosure, in the internal combustion engine control apparatus of any one of the fourth to sixth aspects, the air-fuel ratio estimation unit may calculate an air-fuel ratio coefficient C_AF representing a slope of an equivalence ratio of the air-fuel mixture with respect to the pressure difference ΔP on a basis of the temperature property of the specific-heat ratio of the air-fuel mixture in accordance with the reference crank angle CA_REF, the initial crank angle, the initial cylinder temperature T_STRT, and the initial cylinder pressure and may calculate the air-fuel ratio AF of the air-fuel mixture on a basis of a value obtained by multiplying the pressure difference ΔP by the calculated air-fuel ratio coefficient C_AF (steps 7, 11, and 12 in FIG. 3 and FIG. 13).

The reference cylinder pressure is a cylinder pressure generated when the air-fuel ratio is the predetermined air-fuel ratio (the theoretical air-fuel ratio or the target air-fuel ratio). For this reason, if an actual air-fuel ratio is equal to the predetermined air-fuel ratio, the actual cylinder pressure coincides with the reference cylinder pressure, and the pressure difference between the pressures is 0. The pressure difference increases with an increase in the difference between the actual air-fuel ratio and the predetermined air-fuel ratio. As shown in FIG. 5, the pressure difference (ΔP) has a linear relationship with the equivalence ratio (KAF) of the air-fuel mixture, and the property that the slope of the equivalence ratio varies with intake and compression conditions is found.

From the above-described relationships, according to the above-described configuration, the air-fuel ratio coefficient representing the slope of the equivalence ratio of the air-fuel mixture with respect to the pressure difference is calculated in accordance with the reference crank angle, the initial crank angle, the initial cylinder temperature, and the initial cylinder pressure at the time of estimating the air-fuel ratio. It is thus possible to appropriately calculate the air-fuel ratio coefficient while reflecting the intake and compression conditions for the air-fuel mixture using parameters used to calculate the reference cylinder pressure. Since the value obtained by multiplying the pressure difference by the air-fuel ratio coefficient represents the equivalence ratio corresponding to a deviation (gap) of the air-fuel ratio from the predetermined air-fuel ratio, the air-fuel ratio can be estimated with high accuracy by calculating the air-fuel ratio of the air-fuel mixture on the basis of the value.

According to an eighth aspect of the present disclosure, in the internal combustion engine control apparatus of any one of the first to seventh aspects, the cylinder pressure sensor 51 may include a pressure detection element for detecting the cylinder pressure and an amplifier circuit that amplifies a signal output from the pressure detection element and outputs the signal, and the pressure detection element and the amplifier circuit may be provided integrally with a fuel injection valve 4 that directly injects fuel into the cylinder 3a.

The cylinder pressure sensor with the above-described configuration, the pressure detection element and the amplifier circuit of which are provided integrally with the fuel injection valve, is unlikely to be affected by noise due to ignition operation and noise due to injection operation of a fuel injection valve of a different cylinder. For this reason, the accuracy of detecting the actual cylinder pressure by the cylinder pressure sensor is enhanced, which allows further improvement in the accuracy of estimation of the air-fuel ratio.

Obviously, numerous modifications and variations of the present invention are possible in light of the above teachings. It is therefore to be understood that within the scope of the appended claims, the invention may be practiced otherwise than as specifically described herein.

What is claimed is:

1. An internal combustion engine control apparatus for estimating an air-fuel ratio of an air-fuel mixture, with which a cylinder is filled, and controlling an internal combustion engine using the estimated air-fuel ratio, the control apparatus comprising:
   a cylinder pressure sensor that detects a pressure in the cylinder as a cylinder pressure;
   an operational status detection unit that detects an operational status of the internal combustion engine;
   a reference crank angle setting unit that sets, as a reference crank angle, a crank angle immediately before combustion of the air-fuel mixture is started in accordance with the detected operational status of the internal combustion engine;
   a reference cylinder pressure calculation unit that calculates, as a reference cylinder pressure, a pressure in the cylinder generated at the set reference crank angle on a basis of a temperature property of a specific-heat ratio of the air-fuel mixture on the conditions that no external EGR gas derived from an exhaust reflux is present in the air-fuel mixture and that the air-fuel ratio of the air-fuel mixture is a predetermined air-fuel ratio;
   an air-fuel ratio estimation unit that estimates the air-fuel ratio of the air-fuel mixture on a basis of a pressure difference between an actual cylinder pressure detected at the reference crank angle by the cylinder pressure sensor and the calculated reference cylinder pressure; and
   a control unit that controls the internal combustion engine in accordance with the estimated air-fuel ratio of the air-fuel mixture.

2. The internal combustion engine control apparatus according to claim 1, wherein
   the operational status detection unit detects, as the operational status of the internal combustion engine, ignition timing, a pressure of intake air to be sucked into the cylinder, and a speed of the internal combustion engine, and
   the reference crank angle setting unit sets the reference crank angle in accordance with the detected ignition timing, the detected intake air pressure, and the detected speed of the internal combustion engine.

3. The internal combustion engine control apparatus according to claim 2, wherein
   the reference crank angle setting unit limits the set reference crank angle to a crank angle corresponding to a compression TDC if the reference crank angle is closer to a retard side than the compression TDC.

4. The internal combustion engine control apparatus according to claim 1, further comprising:
an initial crank angle acquisition unit that acquires, as an initial crank angle, a crank angle at a compression start time when compression of the air-fuel mixture is started in a compression stroke;
an initial cylinder temperature acquisition unit that acquires, as an initial cylinder temperature, a temperature in the cylinder at the compression start time; and
an initial cylinder pressure acquisition unit that acquires, as an initial cylinder pressure, a pressure in the cylinder at the compression start time, wherein
the reference cylinder pressure calculation unit calculates the reference cylinder pressure on a basis of the temperature property of the specific-heat ratio of the air-fuel mixture in accordance with the reference crank angle, the acquired initial crank angle, the acquired initial cylinder temperature, and the acquired initial cylinder pressure on the condition that the predetermined air-fuel ratio is a theoretical air-fuel ratio.

5. The internal combustion engine control apparatus according to claim 1, further comprising:
an initial crank angle acquisition unit that acquires, as an initial crank angle, a crank angle at a compression start time when compression of the air-fuel mixture is started in a compression stroke;
an initial cylinder temperature acquisition unit that acquires, as an initial cylinder temperature, a temperature in the cylinder at the compression start time;
an initial cylinder pressure acquisition unit that acquires, as an initial cylinder pressure, a pressure in the cylinder at the compression start time; and
a target air-fuel ratio setting unit that sets a target air-fuel ratio as a target for the air-fuel ratio of the air-fuel mixture, wherein
the reference cylinder pressure calculation unit calculates the reference cylinder pressure on a basis of the temperature property of the specific-heat ratio of the air-fuel mixture in accordance with the reference crank angle, the acquired initial crank angle, the acquired initial cylinder temperature, the acquired initial cylinder pressure, and the set target air-fuel ratio on the condition that the predetermined air-fuel ratio is the target air-fuel ratio.

6. The internal combustion engine control apparatus according to claim 4, further comprising:
a speed detection unit that detects a speed of the internal combustion engine; and
cooling water temperature detection unit that detects a temperature of cooling water which cools the internal combustion engine, wherein
the reference cylinder pressure calculation unit corrects the reference cylinder pressure in accordance with the detected speed of the internal combustion engine and the detected temperature of the cooling water.

7. The internal combustion engine control apparatus according to claim 4, wherein
the air-fuel ratio estimation unit calculates an air-fuel ratio coefficient representing a slope of an equivalence ratio of the air-fuel mixture with respect to the pressure difference on a basis of the temperature property of the specific-heat ratio of the air-fuel mixture in accordance with the reference crank angle, the initial crank angle, the initial cylinder temperature, and the initial cylinder pressure and calculates the air-fuel ratio of the air-fuel mixture on a basis of a value obtained by multiplying the pressure difference by the calculated air-fuel ratio coefficient.

8. The internal combustion engine control apparatus according to claim 1, further comprising:
a fuel injection valve that directly injects fuel into the cylinder, wherein
the cylinder pressure sensor includes a pressure detection element for detecting the cylinder pressure and an amplifier circuit that amplifies a signal output from the pressure detection element and outputs the signal, and the pressure detection element and the amplifier circuit are provided integrally with the fuel injection valve that directly injects the fuel into the cylinder.

9. An internal combustion engine control apparatus comprising:
a cylinder pressure sensor to detect a cylinder pressure in the cylinder to which an air-fuel mixture is supplied;
a driving condition detector to detect a driving condition in an internal combustion engine;
a reference crank angle setter to calculate, in accordance with the driving condition detected by the driving condition detector, a reference crank angle immediately before which the air-fuel mixture in the cylinder starts combusting;
a reference cylinder pressure calculator to calculate a reference cylinder pressure in the cylinder at the reference crank angle based on temperature characteristics of a specific-heat ratio of the air-fuel mixture under a condition that the air-fuel mixture does not include external EGR gas derived from an exhaust reflux and that the air-fuel mixture has a predetermined air-fuel ratio;
an air-fuel ratio estimator to calculate the air-fuel ratio of the air-fuel mixture based on a pressure difference between the reference cylinder pressure and the cylinder pressure detected by the cylinder pressure sensor at the reference crank angle; and
a controller to control the internal combustion engine in accordance with the air-fuel ratio of the air-fuel mixture calculated by the air-fuel ratio estimator.

10. The internal combustion engine control apparatus according to claim 9, wherein
the driving condition detector detects, as the driving condition of the internal combustion engine, ignition timing, a pressure of intake air to be sucked into the cylinder, and a speed of the internal combustion engine, and
the reference crank angle setter sets the reference crank angle in accordance with the detected ignition timing, the detected intake air pressure, and the detected speed of the internal combustion engine.

11. The internal combustion engine control apparatus according to claim 10, wherein
the reference crank angle setter limits the set reference crank angle to a crank angle corresponding to a compression TDC if the reference crank angle is closer to a retard side than the compression TDC.

12. The internal combustion engine control apparatus according to claim 9, further comprising:
an initial crank angle acquisitor to acquire, as an initial crank angle, a crank angle at a compression start time when compression of the air-fuel mixture is started in a compression stroke;
an initial cylinder temperature acquisitor to acquire, as an initial cylinder temperature, a temperature in the cylinder at the compression start time; and an initial cylinder pressure acquisitor to acquire, as an initial cylinder pressure, a pressure in the cylinder at the compression start time, wherein the reference cylinder pressure calculator calculates the reference cylinder pressure on a basis of the temperature characteristics of the specific-heat ratio of the air-fuel mixture in accordance with the reference crank angle, the acquired initial crank angle, the acquired initial cylinder temperature, and the acquired initial cylinder pressure under a condition that the predetermined air-fuel ratio is a theoretical air-fuel ratio.

13. The internal combustion engine control apparatus according to claim 9, further comprising:

an initial crank angle acquisitor to acquire, as an initial crank angle, a crank angle at a compression start time when compression of the air-fuel mixture is started in a compression stroke;

an initial cylinder temperature acquisitor to acquire, as an initial cylinder temperature, a temperature in the cylinder at the compression start time;

an initial cylinder pressure acquisitor to acquire, as an initial cylinder pressure, a pressure in the cylinder at the compression start time; and a target air-fuel ratio setter to set a target air-fuel ratio as a target for the air-fuel ratio of the air-fuel mixture, wherein the reference cylinder pressure calculator calculates the reference cylinder pressure on a basis of the temperature characteristics of the specific-heat ratio of the air-fuel mixture in accordance with the reference crank angle, the acquired initial crank angle, the acquired initial cylinder temperature, the acquired initial cylinder pressure, and the set target air-fuel ratio on a condition that the predetermined air-fuel ratio is the target air-fuel ratio.

14. The internal combustion engine control apparatus according to claim 12, further comprising:

a speed detector to detect a speed of the internal combustion engine; and cooling water temperature detector to detect a temperature of cooling water which cools the internal combustion engine, wherein the reference cylinder pressure calculator corrects the reference cylinder pressure in accordance with the detected speed of the internal combustion engine and the detected temperature of the cooling water.

15. The internal combustion engine control apparatus according to claim 12, wherein the air-fuel ratio estimator calculates an air-fuel ratio coefficient representing a slope of an equivalence ratio of the air-fuel mixture with respect to the pressure difference on a basis of the temperature property of the specific-heat ratio of the air-fuel mixture in accordance with the reference crank angle, the initial crank angle, the initial cylinder temperature, and the initial cylinder pressure and calculates the air-fuel ratio of the air-fuel mixture on a basis of a value obtained by multiplying the pressure difference by the calculated air-fuel ratio coefficient.

16. The internal combustion engine control apparatus according to claim 9, further comprising:

a fuel injection valve that directly injects fuel into the cylinder, wherein the cylinder pressure sensor includes a pressure detection element for detecting the cylinder pressure and an amplifier circuit that amplifies a signal output from the pressure detection element and outputs the signal, and the pressure detection element and the amplifier circuit are provided integrally with the fuel injection valve that directly injects the fuel into the cylinder.

\* \* \* \* \*